US006366947B1

(12) United States Patent
Kavner

(10) Patent No.: US 6,366,947 B1
(45) Date of Patent: Apr. 2, 2002

(54) SYSTEM AND METHOD FOR ACCELERATING NETWORK INTERACTION

(75) Inventor: Eugene D. Kavner, Redmond, WA (US)

(73) Assignee: Redmond Venture, Inc., Redmond, WA (US)

( * ) Notice: Subject to any disclaimer, the term of this patent is extended or adjusted under 35 U.S.C. 154(b) by 0 days.

(21) Appl. No.: 09/009,071

(22) Filed: Jan. 20, 1998

(51) Int. Cl.[7] .............................................. G06F 15/16
(52) U.S. Cl. ...................................... 709/203; 709/217
(58) Field of Search ................................ 709/203, 202, 709/213–216, 217–218, 328; 345/335, 744–745

(56) References Cited

U.S. PATENT DOCUMENTS

| 5,715,445 A | | 2/1998 | Wolfe .............................. 707/5 |
| 5,787,470 A | * | 7/1998 | DeSimone et al. ......... 711/124 |
| 5,794,259 A | * | 8/1998 | Kikinis ....................... 709/218 |
| 5,802,292 A | * | 9/1998 | Mogul ........................ 709/203 |
| 5,805,809 A | * | 9/1998 | Singh et al. ................. 709/203 |
| 5,821,927 A | * | 10/1998 | Gong ........................... 345/335 |
| 5,842,216 A | * | 11/1998 | Anderson et al. ........... 709/203 |
| 5,852,717 A | * | 12/1998 | Bhide et al. ................. 709/203 |
| 5,907,681 A | * | 3/1999 | Bates et al. ................. 709/228 |
| 5,918,013 A | * | 6/1999 | Mighdoll et al. ........... 709/217 |

(List continued on next page.)

OTHER PUBLICATIONS

Liljeberg, M., et al., "Mowgli WWW Software: Improved Usability of WWW in Mobile WAN Environments," Proc. of Globecom '96, IEEE, pp. 33–37, Nov. 1996.*
Dingle, A., et al., "Web Cache Coherence," Comp. Networks & ISDN Systems, vol. 28, No. 11, pp. 907–920, May 1996.*
Wu, S., et al., "Virtual Proxy Servers for WWW and Intelligent Agents on the Internet," Proc. Of the Thirtieth Hawaii Int'l Conf. On Systems Sciences, IEEE, pp. 200–209, Jan. 1997.*

Wang, Z., et al., "Prefetching in World Wide Web," Proc. of Globecom '96, IEEE, jpp. 28–32, Nov. 1996.*
Reddy, M., et al., "An Adaptive Mechanism for Web Browser Cache Management," Internet Computing, IEEE, vol. 2, No. 1, pp. 78–81, Jan. 1998.*

(List continued on next page.)

*Primary Examiner*—Zarni Maung
*Assistant Examiner*—Andrew Caldwell
(74) *Attorney, Agent, or Firm*—Fulbright & Jaworski

(57) ABSTRACT

A method and system operable with a network user interface operable on a general purpose computer capable of multi-threaded operation is disclosed which accelerates network interaction through intelligent cacheing, intelligent fetching, and intelligent filtering of data. In a preferred embodiment, such intelligent cacheing, fetching, and filtering of data are achieved by implementing an instruction set between the network user interface and the network to accomplish such tasks in a manner transparent to the user. According to one aspect, resources that are identified as unnecessary, such as ad data files, are not downloaded. Thus, communication of resources identified as unnecessary may be avoided. According to another aspect, during the second and subsequent accesses of network information, any resources present in a local cache are presented to the user immediately, without first determining if a later version of the resource is available over the network. More specifically, in response to a request for a resource present in a local cache, the instruction set may immediately provide the user interface a response expected by the user interface, thereby appearing to the user interface that the resource was obtained via the network. In the background, resource requests are issued over the network to download information that has been updated since stored in the cache. In another aspect, information determined to likely be subsequently accessed by a user, such as is determined from currently accessed information, is preloaded so upon selection by the user it is immediately available.

77 Claims, 7 Drawing Sheets

U.S. PATENT DOCUMENTS

| | | | | |
|---|---|---|---|---|
| 5,931,904 A | * | 8/1999 | Banga et al. | 709/217 |
| 5,944,780 A | * | 8/1999 | Chase et al. | 709/201 |
| 5,946,682 A | | 8/1999 | Wolfe | 707/5 |
| 5,978,841 A | * | 11/1999 | Berger | 709/217 |
| 5,991,760 A | * | 11/1999 | Gauvin et al. | 707/10 |
| 6,038,601 A | * | 3/2000 | Lambert et al. | 709/226 |
| 6,076,103 A | * | 6/2000 | Sakai | 709/217 |
| 6,085,226 A | * | 7/2000 | Horvitz | 709/203 |
| 6,105,028 A | * | 8/2000 | Sullivan et al. | 707/10 |
| 6,122,657 A | * | 9/2000 | Hoffman, Jr. et al. | 709/201 |
| 6,138,141 A | * | 10/2000 | DeSimone et al. | 709/203 |
| 6,185,625 B1 | * | 2/2001 | Tso et al. | 709/247 |
| 6,195,622 B1 | * | 2/2001 | Altschuler et al. | 703/2 |
| 6,230,168 B1 | * | 5/2001 | Unger et al. | 707/501 |
| 6,233,606 B1 | * | 5/2001 | Dujari | 709/213 |
| 6,249,804 B1 | * | 6/2001 | Lam | 709/203 |

OTHER PUBLICATIONS

Ortega, A., et al., "Soft Caching: Web Cache Management Techniques for Images," Proc. IEEE 1st Workshop on Multimedia Signal Processing, IEEE, pp. 475–480, Jun. 1997.*

Kaashoek, M., et al., "Dynamic Documents: Mobile Wireless Access to the WWW," Proc. Workshop on Mobile Computing Systems & Applications, IEEE, pp. 179–184, Dec. 1994.*

Schilit, B., et al., "TeleWeb: Loosely Connected Access to the World Wide Web," Comp. Networks & ISDN Systems, vol. 28, No. 11, pp. 1431–1444, May 1996.*

Wooster, R., et al., "Proxy Caching That Estimates Page Load Delays," Comp. Networks & ISDN Systems, vol. 29, No. 8–13, pp. 977–976, Sep. 1997.*

Luotonen, A., et al., "World–Wide Web Proxies," Comp. Networks & ISDN Systems, vol. 27, No. 2, pp. 147–154, Nov. 1994.*

Baentsch, M., et al., "World Wide Web Caching: the Application–Level View of the Internet," Communications Magazine, IEEE, vol. 35, No. 6, pp. 170–178, Jun. 1997.*

Markatos, E., "Main Memory Caching of Web Documents," Comp. Networks & ISDN Systems, vol. 28, No. 11, pp. 893–905, May 1996.*

Glassman, S., "A Caching Relay for the World Wide Web," Comp. Networks & ISDN Systems, vol. 27, No. 2, pp. 165–173, Nov. 1994.*

* cited by examiner

SYSTEM AND METHOD FOR ACCELERATING NETWORK INTERACTION

TECHNICAL FIELD OF THE INVENTION

The present invention relates to the use of computers on a network, such as the Internet, and to the process of interacting therewith, such as browsing web sites and downloading data therefrom, and, more particularly, to systems and methods for accelerating the acquisition and display of network data.

BACKGROUND OF THE INVENTION

It is common today for computers, such as general purpose personal computers found in the home or office, to be used to access information available from a network. For example, it is common for an operator of a personal computer to browse web sites on the Internet. Such computers typically employ a modem (modulator-demodulator), or other low speed (as compared to the internal processing speed of the computer) communication interfaces, for the purpose of interfacing the computer to a network, such as the Internet, through, for example, a PSTN (Public Switched Telephone Network) or other communication gateway.

Additionally, a standard network user interface is often utilized in order to both provide predictable and user friendly interaction with a user and to provide compatibility with a plurality of network devices operable on the network. Examples of such standardized network user interfaces are NETSCAPE NAVIGATOR by Netscape Communications Corporation and INTERNET EXPLORER by Microsoft which are often referred to as "Internet browsers." These network user interfaces provide a standardized platform through which network devices may provide robust interaction with a variety of different user computer hardware and software. For example, rich graphic images may be provided by a network device for display upon a variety of different computer systems by providing data, such as in the form of a joint photographic experts group (JPEG) data file, operable with a standard network user interface to generate the image on the user's computer. Accordingly, the computer hardware becomes nearly transparent to the user and the network device as the user interface arbitrates the interaction in a similar manner regardless of the particular computer platform upon which it operates. Of course, the use of such a network user interface may include the use of a plurality of program modules and data files, such as application programming interface (API) modules and data libraries.

The performance of computers interacting with networks, such as during browsing of the Internet, is often disagreeably slow. There are at least two major factors that affect performance of a computer interacting with networks such as the Internet. These two factors are the speed of the communication interface, i.e., the baud rate of the modem used with the computer, and network latency.

The communication interface speed is a limit on the speed at which data from a host server on the network, such as an Internet web site, is downloaded to the user's computer. For example, where the computer is coupled to the network via a 28.8 KiloBaud modem, an image that is 30,000 characters in length will take approximately ten seconds to download to the user's computer. However, if the modem is a 14.4 KiloBaud modem, the same image will take approximately twenty seconds to download. Of course, if an even slower modem is used, downloading that same image will take a proportionally longer length of time.

Even where a network interface significantly faster than the speeds described above, the transfer of information between the network and the user's computer can require an appreciable time. Often a user's computer is a part of a local area network (LAN), used for example as an enterprise wide intranet or for providing a gateway to another network such as the Internet, where the network interface is rated at a speed substantially higher than those of the modems described above. However, these LANs typically provide data throughput significantly slower than the internal processing speed of the computer and often provide actual data throughput slower than the communication rate of the network interface card (NIC). For example, Ethernet systems rated at 10 Mbps often deliver actual throughput of approximately 1 Mbps due to heavy network usage causing multiple data packet collisions and/or routers, bridges and concentrators causing data bottlenecks. Accordingly, downloading an image as described above can take a substantial amount of time to download to the user's computer.

Network latency is the time it takes for the network devices, such as an Internet web site and the devices coupling the web site to the user's computer, to provide a response to the user's computer when it makes a request. For example, it may take a second or longer for a server hosting an Internet site to respond to a request for a single image. If the data requested by the user's computer contains multiple such images, for example a web page having 20 to 30 images, the total latency introduced by the server providing these images is potentially 20 to 30 seconds.

Moreover, the server is typically not the only network device affecting the network latency as perceived by the user. Generally, other network devices are utilized in providing data communication between the user's computer requesting data and the server providing the data. Such other devices may include communication servers, routers, bridges, and gateways. Each of the devices operable in the link between the user's computer and the server being accessed may potentially introduce additional latency time as experienced by the user.

Although not a network latency problem, there is generally latency associated with the user of the computer system, such as in reviewing data presented and selecting an appropriate next interaction. During this user latency period the capacity of the network interface is not used, or at least not used to the full extent. For example, a user browsing the Internet may be presented with a web page giving the user particular information in the form of text, graphic images, and the like. Associated with particular information of the web page may be links, commonly referred to as hyperlinks or "buttons," to other web pages or other resources having related or additional information. There may be significant periods of time where the network interface remains idle, or nearly so, after transmission of the data of a displayed page, while the user assimilates the displayed data and decides how to interact next. Often the next interaction is in the form of selection of one of the links presented which results in the retrieval, as affected by the above-described network latencies, over the network of the associated information.

A further problem exists in the prior art in that desired information is often associated with undesired or unnecessary information. For example, in the above-mentioned web pages, there are typically information resources such as text and graphic images associated with sponsors of the web page. Likewise, there are often information packets associated with the particular user and his/her interaction with the network device, often called "cookies" in Internet parlance, which are transferred to and/or from the user computer. The above resources, although often not desired by the user and often quite large in data content, require communication bandwidth to be transferred to or from the user's computer, although the user would probably prefer to forgo their transmission in favor of transmission of the desired information. Accordingly, the transmission of this unnecessary information through the network, including the aforementioned latency problems, and the network interface, having the aforementioned speed limitations, during network interaction only exasperates the already disagreeable performance of the network.

Accordingly, there is a need in the art for a system and method of accelerating interaction over a network. Specifically, there is a need in the art for a system and method for accelerating the operation of a web browser in downloading and presenting data from a network server hosting a web site.

There is a further need for more nearly fully utilizing the communication capacity of the network. In particular there is a need for utilizing network interface idle time in order to compensate for latencies caused by network communications.

There is yet a further need in the art for a system and method for filtering out the transmission of unwanted or unnecessary information between the network and the user's computer.

There is a still further need in the art for the above systems and methods to be utilized by standardized user interfaces such as those already in existence and generally deployed.

SUMMARY OF THE INVENTION

These and other objects, features and technical advantages are achieved by a system and method which provides an intelligent cache of data provided over a network in order to more speedily present data to a user. Additionally, an intelligent retrieval system and method are provided to utilize idle network interface bandwidth in order to pre-fetch information which the user is likely to require in a subsequent interaction. Furthermore, filters are provided to avoid or eliminate the transmission of unnecessary or undesired information such as advertisements or cookies.

Preferably, the above-described systems and methods are embodied in a software product operable on general purpose processor-based systems, such as personal computers based on the Intel 80X86 or Motorola 680X0 platforms. A further preferred embodiment is capable of transparent use with existing network user interfaces, such as NETSCAPE NAVIGATOR and/or INTERNET EXPLORER. Accordingly, this preferred embodiment is in the form of a software module, or plug-in, specifically adapted to interface with selected network user interfaces in order to provide ones of the above-described functions.

In understanding the operation of the present invention it is helpful to review information with respect to operation of prior art networks and network user interfaces. To aid in understanding the present invention, the specific example of an Internet browser interacting with the Internet, such as through a web site, will be discussed. However, it shall be understood that the present invention is not limited to use with network user interfaces in the form of Internet browsers and the Internet. The present invention is useful in any number of network situations, such as local area networks (LANs), wide area networks (WANs), intranets, interactive cable systems, and the like, where acceleration may be had through intelligent caching of network data, more efficient use of throughput bandwidth, and/or filtering of unwanted or unnecessary data. Moreover, use of the present invention is not limited to networks, but may in fact be used to accelerate data communication between many devices having the aforementioned latency and/or throughput limitations.

When using a typical prior art web browser, the first time a user accesses a particular web site or web page, data representing the hypertext markup language (HTML) and graphic images (web resources) are downloaded from the site in a conventional manner and that data, in addition to presenting the data for the user in the browser's window, is stored in a local cache. The local cache is typically associated with the web browser and generally consists of a file, or files, created on a local hard disk. Each resource is downloaded one at a time as a result of a GET <resource> request. If there are 30 resources on a web page, there are 30 GET <resource> requests issued to the web site. The response to each request contains data representing the resource and the date/time-stamp of when the resource was modified on the server. This stamp is also stored in the local cache.

In the prior art systems, the second or subsequent time a user accesses the same web page, the browser looks at the resource in its cache, but before displaying the resource to the user, the browser issues a GET <resource> request to the server with an If-Modified-Since: <date/time of modification> tag. The If-Modified-Since tag contains the date/time-stamp of the resource in the browser's cache. The server downloads the resource to the browser only if the resource has been modified since the stamp indicated in the If-Modified-Since tag. If the resource has not been modified, the server responds with a Not Modified code indicating to the browser that the copy of the resource in the cache should be presented for the user. However, regardless of whether the resource is downloaded from the server or is retrieved from the local cache, the resource is displayed to the user only after the server's response.

It shall be appreciated that the aforementioned software calls, such as GET and If-Modified-Since, are typical of software calls which may be found in a software call library such as those of the Winsock library in common use with web browsers today. However, it should be understood that these particular calls are used herein for illustrative purposes and are not intended to be a limitation of the present invention.

According to the preferred embodiment of the present invention, the intelligent cache operates much like the prior art system the first time a user accesses a particular web site or page. Accordingly, data representing the HTML and graphic image web resources are downloaded from the site and stored in the local cache. However, subsequent accesses to the page by the user results in all resources being immediately drawn from the local cache for presentation to the user. Additionally, the present invention operates to issue requests to the web site, substantially simultaneously with the immediate presentation of the cached resources to the user, in order to determine if the corresponding resources have been updated since their storage in cache. The user gets the benefit of being able to see the web page immediately while the resources that have changed since they were previously downloaded are updated in the background.

The foregoing is preferably accomplished by incorporating in the user computer a modified instruction set, such as in the form of a second Winsock library interposed between the web browser and the original or first Winsock library, in order to alter the way in which the computer operates with respect to network requests. By interposing the new library between the web browser and the original library, it is possible to simulate the sending of calls over the Internet without actually sending such calls. This accelerates steps involving "get" calls, which are calls that typically go out over the, somewhat slower, Internet to the web sites, by servicing the requests locally within the computer. To the web browser, operation of the present invention is substantially transparent, as it appears that the call is going out over the Internet. However, instead of transmitting the call though the network interface, the user computer first looks in a local storage cache for the needed data and gives it to the web browser if it is available. Because the information is provided locally, through internal bus structures having significantly higher bandwidth than the typical network interface, thus avoiding the network interface bottleneck and latencies associated with the network, the presentation of data to the user is accelerated dramatically.

The present invention, operating in the background of the loading of data from the local storage cache, sends a "get" to the server hosting a web site, and identifies changes since the previous load stored in the cache. Preferably, the user computer notifies the user of changes in the data, as between that presented to the user and that currently available from the server, by issuing an audible sound, such as a beep or tone. The user can then refresh the page, typically by pressing a key, such as function key F5 on the user computer, or by clicking a mouse button. Of course, other methods of notifying the user of changes in the data and/or its presentation may be utilized, such as the automatic refreshing of the display upon the downloading of updated resources, if desired.

According to the present invention, during the second and subsequent accesses to a web page, any resources present in the local cache are displayed to the user immediately. In the background the present invention causes the GET <resource> requests to be issued to the server in order to update the cache and/or presentation to the user. However, because the resources are displayed immediately, even though they might be out-of-date, the overall perception of speed is increased. Moreover, because the resources are displayed immediately, prior even to a response to a GET <resource> request with an If-Modified-Since: <date/time of modification> tag as required by the prior art systems before loading data from cache, speed is actually increased even over the prior art system where the data is stored in cache.

However, because the resources are still requested in the background, the overall time it takes to get the most recent resources remains substantially the same as the prior art when the intelligent cache of the present invention is used alone. The intelligent cache principally speeds up the process of putting a web page on the monitor screen of the user's computer by eliminating the network latency wait and the network interface speed related wait due to going out over the Internet.

According to a preferred embodiment of the present invention, the intelligent fetch function operates to pre-load hypertext links so that if the user selects a particular link, the corresponding web page is displayed immediately instead of waiting for the download of the entire page at that time. While the user is looking at the current page, the present invention operates in the background to fetch all the links associated with the present page, so that when the user eventually is ready to select one of the links, it is likely that the page is already on the user's machine in a cache.

Preferably, in accordance with the present invention, the user's previously used links are remembered, and those links are pre-loaded first. Accordingly, the links most likely to be selected by the user, based on historical information, are pre-loaded before those links never before accessed by the user. As such, where a web page provides a number of links sufficient to require download time in excess of the viewing time of the web page by the user, the present invention operates to increase the likelihood that a link subsequently selected by the user will have already been downloaded.

It shall be appreciated that the intelligent fetch function of the present invention in combination with the aforementioned intelligent cache of the present invention operate to accelerate the interaction of the user computer with the network server. For example, in addition to pre-loading links, the intelligent fetch function may operate with the intelligent cache function in order to pre-fetch only those resources which have been changed from the last time the user accessed the resource. Accordingly, more background download time may be devoted to the acquisition of resources changed since the user's previous access or which have never been previously accessed by the user. As this pre-fetching is performed in the background, resources requiring updated data from a previous access may be presented to a user instantaneously, including the updated data pre-downloaded in the background, upon selection of an associated link by the user. Moreover, links which have never been accessed by the user may be presented to a user instantaneously, provided sufficient time elapses between the loading of the current web page and the selection of a link by the user.

The ad filter or ad blocking feature of a preferred embodiment of the present invention recognizes Internet advertising patterns and code and permits loading a page rapidly without tying up network resources downloading and displaying the advertising. Instead of the ad, a blank space, or other image or message, is displayed on the user's computer screen. Of course, the user can view ads, if desired. For example, the user could disable the ad filter during certain sessions, for selected web sites or pages, for ads fitting selected criteria, or the like. Likewise, the user could completely disable the ad filter if it is desired to view all ads.

According to a preferred embodiment of the present invention, the ad filter is implemented by compiling an ad list. When a request is issued, a comparison is made with the ad list to determine if the requested resource is on the ad list. This ad list may be initialized and/or updated periodically by a central source, such as an ad server which maintains a master list. The server may assimilate information from other users or may itself pole the network to determine the existence of ads to add to the list. Alternatively, the ad list may be associated solely with the particular network user interface and, accordingly, include only ads discovered by this network user interface.

Resources may be determined to be ads, either by the network user interface or the aforementioned central source, from information such as universal resource locator (URL) information. For example, if a graphic image is located on a site in a different domain than the web page it may be determined to be an ad. Additionally, or alternatively, if the portion of the URL the left of the domain is specified as "ad", "ads", "/ads", "ad/", a "sponsor", a "banner", or the like, it may be determined to be an ad. When such a resource is detected, its resource name is preferably added to the ad list and, therefore, not retrieved or displayed by the browser.

The cookie filter feature of a preferred embodiment of the present invention employs some features of the ad filter. The ad filter software operates to identify ad networks. According to the preferred embodiment, if a graphic image is located on a site in a different domain than the page, it is determined to be an ad. Furthermore, as this resource is located in a different domain, it is likely that this domain is an ad network. Typically, when an ad network serves up an ad resource it also attempts to send a cookie, generally using an HTTP "SET COOKIE" command. However, the cookie filter software of the present invention operates to erase this cookie. The cookie filter feature preferably erases the transmission of a cookie in either direction, from the ad network, and to the ad network and, thus, prevents the ad network from compiling utilization and/or demographic data about the user for subsequent marketing campaigns.

The cookie filter of the present invention may be operated to filter all cookies from being transmitted and/or received. However, often cookies are desired by a user in order to automatically establish user preferences, account numbers, passwords, and the like. Accordingly, the preferred embodiment of the present invention operates an intelligent cookie filter in order to filter only cookies identified as undesirable cookies, such as the aforementioned ad cookies. Of course, the present invention may be utilized to filter other cookies, such as those associated with particular sites, pages, resources, or the like, if desired. The system can be designed to also filter other types of non-worded material and can operate on various parameters, such as length, content, relative placement of material, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
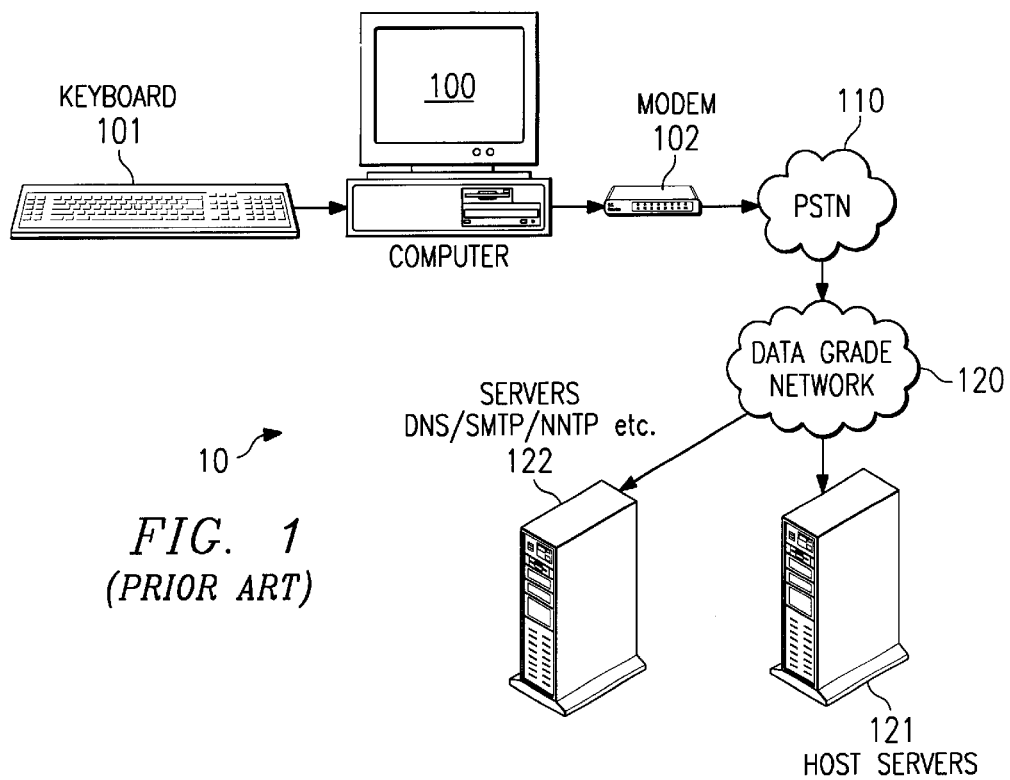
FIG. 1 is a diagram showing the interconnection in schematic form of basic elements of a computer network system.

In order to better understand the present invention, the following is a brief discussion of conventional downloading from a computer network, such as the Internet is offered. Referring to FIG. 1, there is shown a conventional prior art network system having user computer 100, including keyboard 101, and having resident therein a general purpose operating system such as WINDOWS, UNIX, MACINTOSH OS, or the like. User computer 100 is connected via a network interface, shown here as modem 102 and public switched telephone network (PSTN) 110, to data grade network 120. In order to more readily describe the present invention, the specific example of network 120 being the Internet shall be used. However, as discussed above, the present invention is not limited to use with the Internet.

Network 120, also referred to hereinafter as Internet 120 for purposes of our specific example, may include a plurality of servers, such as domain name servers (DNS) 122 and host servers 121 hosting Internet sites. The term server as used herein is meant to represent a processor-based system, that interacts with a client to provide desired information, such as selected computer files or resources, on demand.

For example, host servers 121 of the Internet are conventionally associated with Internet service providers and serve up resources related to the services of the particular service provider. Likewise, in the Internet example, DNS 122 converts a site name, essentially presenting a human understandable title, associated with one of the many host servers 121 to a particular transmission control protocol/internet protocol (TCP/IP) address. The TCP/IP address is a unique address on the network, in this example Internet 120, and consists of four 8 bit numbers. The designation TCP/IP identifies the net protocol conventionally used with the Internet and other networks and is well known.

Figure 2:
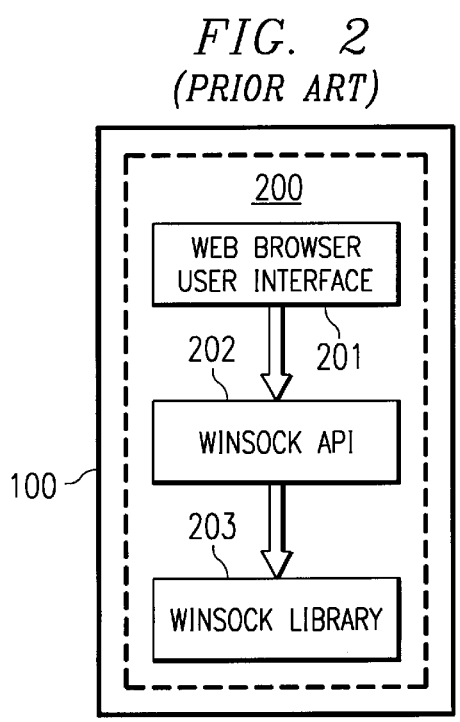
FIG. 2 is a block diagram showing a computer adapted to provide a network user interface including a web browser, an API, and a Winsock library of software calls.

Referring now to FIG. 2, there is shown a block diagram of user computer 100 of FIG. 1 having a network user interface 200 resident therein. It shall be appreciated that the network user interface illustrated is typically embodied in the form of a set of computer instructions, interacting with various data files and/or computer components, to define the operation of the general purpose computer to interact with a user and/or other devices in a particular manner. Using the example of the Internet, network user interface 200 includes web browser user interface 201 coupled through Winsock application programming interface (API) 202 to Winsock library 203. In the illustrated example, the network user interface is coupled by modem 102 and PSTN 110 of FIG. 1 to Internet 120. Of course, different forms of network interfaces may be utilized, such as a NIC coupled to a LAN, if desired.

Web browser 201 may be a standardized software product such as NETSCAPE NAVIGATOR, INTERNET EXPLORER, or the like. Winsock library 203 may be in the form of a dynamic-link library (DLL) such as the file WSOCK32.DLL in general use with the WINDOWS operating system. Accordingly, library 203, which in the case of WSOCK32.DLL typically includes as many as 30 software calls, although perhaps only ten calls may be given much use, may be called only when needed by web browser 201. Winsock API 202 provides an interface between high level web browser 201 and the lower level software calls of Winsock library 203.

Figure 3:
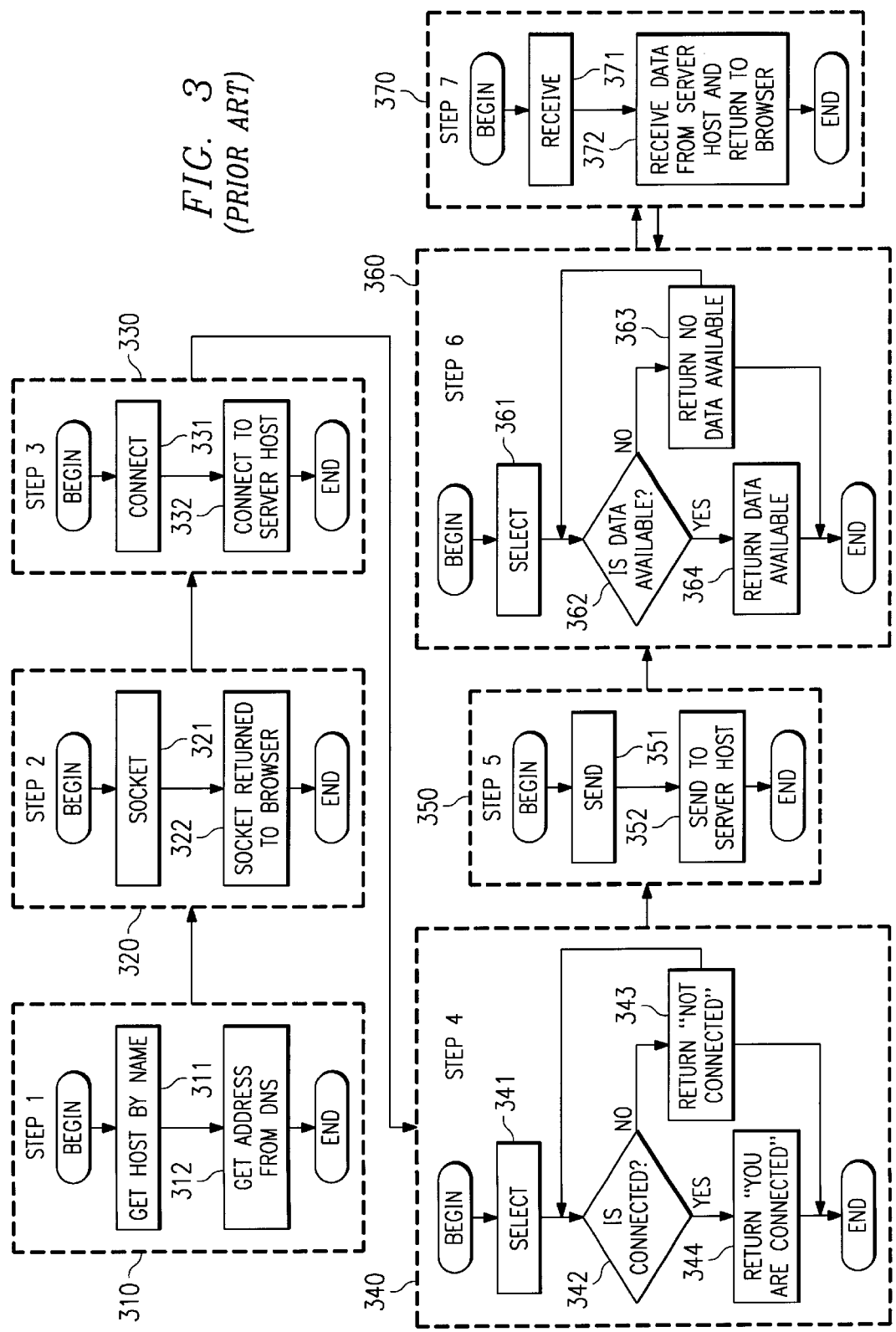
FIG. 3 is a flow chart indicating the sequence of steps that a web browser conventionally implements in seeking to download a resource from an Internet site.

In operation, web browser 201 of FIG. 2 typically implements the sequence of steps shown in the flow diagram of FIG. 3 when downloading a resource from a server, such as host server 121 of FIG. 1. Directing attention to FIG. 3, it can be seen that the first step (step 310) of downloading a desired resource includes a call to "GET HOST BY NAME" (substep 311). A typical URL appears as follows: "http//www.xyz.com/dirl/dir2/page.htm". The portion "http//www.xyz.com" represents the site address or host name, while the portion "/dirl/dir2/page.htm" represents the resource that is to be downloaded from the host server to the client, such as web browser 201. Step 310 operates to determine the host name from such an URL. In response to this call, step 310 operates to convert the host name to the TCP/IP address (substep 312), such as via DNS 122 of FIG. 1.

In the second step of FIG. 3 (step 320), web browser 201 issues a call "SOCKET" (substep 321) that establishes a socket to which a connection from a server, such as host server 121 of FIG. 1, may be made. Successful execution of the call will result in a socket returned to the browser (substep 322).

The third step (step 330) issues a "CONNECT" command (substep 331). This command initiates the connection between the client and server (substep 332).

The fourth step (step 340) issues a "SELECT" command (substep 341). Thereafter, the browser waits for confirmation of connection from the server, such as host server 121, before taking any further action (substep 342). If connection with the server is not confirmed a message of not connected is returned (substep 343) and the browser again waits for confirmation of connection from the server, i.e., returns to step 342. If connection is not established in a preestablished amount of time, processing according to the illustrated steps halts. However if the connection with the server is confirmed a connected message is returned (substep 344) and processing continues to step 350.

In the fifth step (step 350), the command "SEND", which is equivalent to "get resources", is issued (substep 351). Thereafter, the command is sent to the server (substep 352).

At step 360, web browser 201 sends a "SELECT" call to detect if new data has arrived over the network (substep 361). If it is determined that no data is available at substep 362, then a message of no data available is returned (substep 363) and the browser again awaits detection of available data, i.e., returns to substep 362. If data does not become available in a preestablished amount of time or an end of resource transmission is detected, i.e., the resource has been fully downloaded, processing according to the illustrated steps halts. However, if it is determined that data is available a data available message is returned (substep 364) and processing continues to step 370.

In the seventh step (step 370), "RECEIVE" is sent to initiate downloading of the desired resource (substep 371). Thereafter, data is received from the host by the browser (substep 372).

Generally, user computer 100 utilizes a buffer in which the resource is stored. The buffer receives data from the server until it is filled. After the buffer is full, the server waits until the buffer has been emptied and then transmits again until the buffer is full again. This loop, involving step 360 determining if data is available and step 370 receiving the available data into the buffer, continues until there is no more data to be sent. Similarly, connection to the socket continues until all data is sent, and then the connection is broken.

Below is shown a typical format of a message that comes down from an internet server such as host server 121. First there is header information that appears as follows:

```
HTTP/1.0 200 OK
MIME TYPE: TEXT/HTML
MODIFIED ON: DATE TIME (GMT)
COOKIE: _____
TWO CARRIAGE RETURNS
HTML PAGE
```

HTTP indicates the data is being transferred according to the hypertext transfer protocol. The number 200 means that the data follows. GMT stands for Greenwich Mean Time. The cookie notation in the header will be explained hereinafter. The HTML page is sent first because it specifies the format that determines where the text and graphics are to be laid out on the screen of the computer monitor.

It shall be appreciated that there are multiple data exchanges between the user computer and the server, each potentially introducing delays, such as due to network interface bandwidth and network latency. For example, there is a data exchange, and thus an associated wait, for the TCP/IP address at step 310. Similarly, there is a data exchange, and again an associated wait, at step 340 in making the client/server connection. Additionally, there is a data exchange, causing a wait, each time step 360 is performed in the receiving of the desired resource.

Some prior art systems operate to store in a cache resources recently downloaded from the network. Accordingly, if these resources are again selected, the delay involved with their actual download may be avoided. However, as the network resources are prone to change or update between the time they are last accessed and placed in cache and the current request, these prior art systems first conduct a data exchange with the server to determine if there has been a change. This data exchange requires steps as identified above in getting the address (step 310), establishing a socket (step 320), establishing a connection (steps 330 and 340), and sending a request for data regarding the modification date of the current resource (steps 350, 360, and 370). Accordingly, the only data exchange that is avoided is the actual downloading of the resource, and this exchange is not avoided if the resource has changed.

In order to present information to the user without experiencing the above-identified time delays, or others like them, the present invention utilizes an intelligent cache in order to immediately present available information to a user while, in the background, determining if cached data has been updated on the network and, if so, downloading the updated data. Additionally, the preferred embodiment of the present invention utilizes idle network interface bandwidth in order to pre-fetch information which the user is likely to require in a subsequent interaction. Also in the preferred embodiment, filters, adapted to avoid or eliminate the transmission of unnecessary or undesired information such as advertisements or cookies, are used.

Preferably, the present invention is embodied in a computer program operable on general purpose processor-based systems, such as computer 100 of FIG. 1, having a central processing unit (CPU) such as the Intel 80X86 or Motorola 680X0 operating under control of a general purpose operating system such as WINDOWS, UNIX, or MACINTOSH OS. Of course, the present invention may be operated on hosts other than those identified above, provided sufficient resources are available to achieve the functionality set forth hereinbelow.

Preferably the present invention is capable of substantially transparent use with existing network user interfaces, such as NETSCAPE NAVIGATOR and/or INTERNET EXPLORER. As such, a preferred embodiment is in the form of a software module, or plug-in, specifically adapted to interface with selected network user interfaces in order to provide ones of the above-desired functions.

Intelligent Cache

Figure 4:
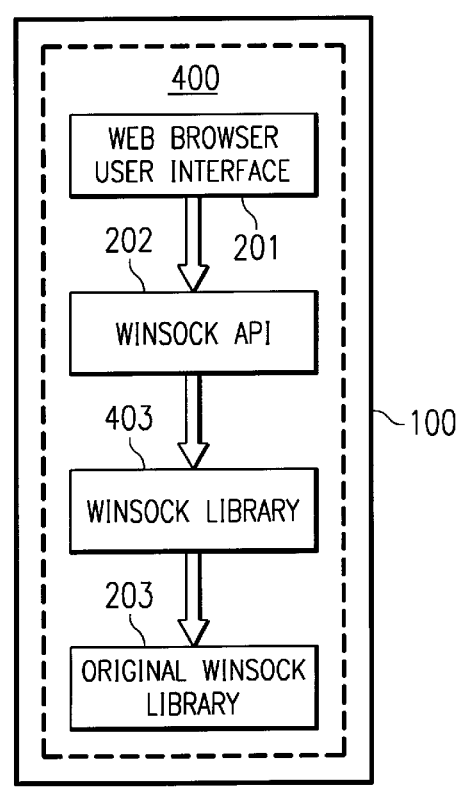
FIG. 4 is a block diagram showing a computer arrangement similar to that of FIG. 2 adapted according to a preferred embodiment of the present invention to include a second Winsock library interposed between the web browser and the original Winsock library.

In accordance with the principles of the present invention, the computer and network user interface arrangement shown in FIG. 2 is preferably modified as shown in FIG. 4. As described with reference to FIG. 1 above, user computer 100 has, resident therein, an operating system such as WINDOWS. In order to provide the background tasking utilized by the present invention, it is desirable to have a multi-threaded operating system. This is because the present invention relies on having several threads operating at the same time. By "thread" is meant a discrete software operation, which may include a plurality of sequential steps.

Referring still to FIG. 4, modified network user interface 400, resident within user computer 100, includes web browser user interface 201 coupled through Winsock API 202 to Winsock library 403 of the present invention. Winsock library 403 is coupled according to the present invention to Winsock library 203. As described above, the network user interface is coupled by modem 102 and PSTN 110 of FIG. 1 to Internet 120. Of course, as previously mentioned, different forms of networks and/or network interfaces may be utilized, such as a NIC coupled to a LAN, if desired.

It shall be appreciated that, according to the preferred embodiment, a second Winsock library 403 is interposed between web browser 201 and the first or original Winsock library 203. This enables the present invention to operate with an existing network user interface, utilizing a pre-defined set of software calls and returns, principally by interposing itself between portions of the network user interface and emulating or simulating the interaction expected. Accordingly, web browser 201 communicates with Winsock library 403 via the same Winsock API used to communicate with the original Winsock library. Of course, Library 403 and 203 can be a single modified library, if desired.

The software calls in Winsock library 403 are substantially the same as those in Winsock library 203. Accordingly, Winsock library 403 communicates with the original library via the same set of calls. However, by interposing the second Winsock library between web browser 201 and Winsock library 203, it is possible to simulate the sending of calls over the network without actually sending such calls.

In a preferred embodiment, interposing of the second library between the network user interface and the original library is accomplished by identifying the new library such that it is called by the network user interface in place of the original library. Accordingly, the old library's identification is changed in order that it is called by the new library when needed. For example, in our Internet example, the original library WSOCK32.DLL, in general use with the WINDOWS operating system, might be renamed WSOCK32_.DLL and the new library named WSOCK32.DLL. Accordingly, when a call is made by the web browser, the new library will be called in place of the original library. This new WSOCK32.DLL library preferably supports the functions supported by the original library, although functioning differently when called in order to provide the network acceleration of the present invention.

Of course, other methods of disposing the new library between the original library and the network user interface may be utilized, if desired. For example, the API may be modified to call the new library rather than the original library. Likewise, the network user interface itself may be modified to call the new library, if desired.

Figure 6:
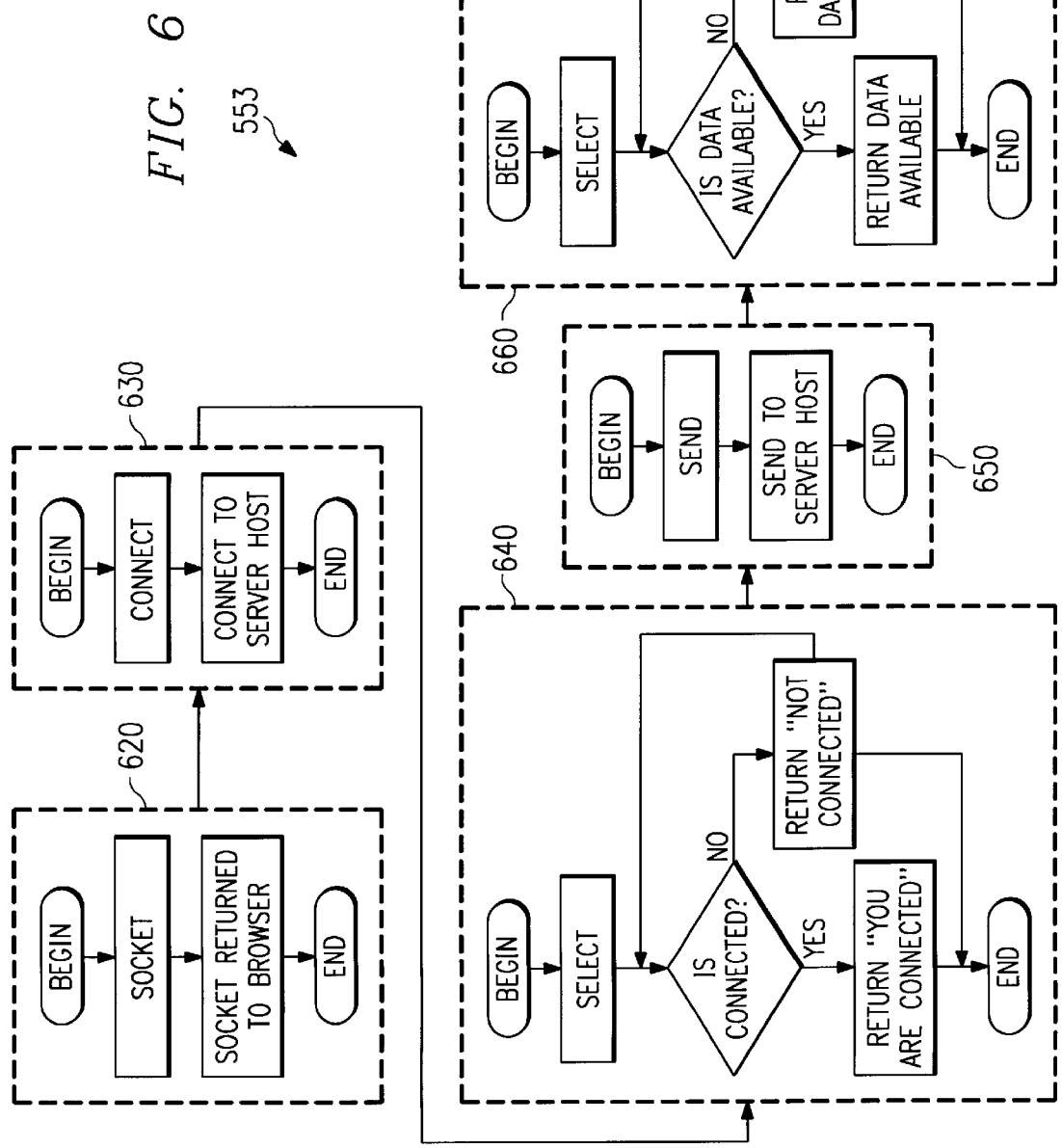
FIG. 6 is a flow chart indicating the sequence of steps that a thread may utilize to accomplish network interaction according to a preferred embodiment of the present invention.

In accordance with the principles of the present invention, "get" calls, calls that go out over the network to retrieve data from the servers, are accelerated by the modified instruction set immediately presenting cached data to the user and downloading modified data in the background. From the viewpoint of web browser 201, it appears that the call is going out over Internet 120. Instead, computer 100, operating according to modified network user interface 400 and, as shown in FIG. 6, first looks in a local storage cache for the needed data. If the data is found in the cache, it is passed to the network user interface for presentation to the user.

The modified portion of the network user interface simulates the connection to a server, such as servers 122 and 121, and, accordingly, web browser 201 operates just as if the above-described steps have been performed. However, all of the interaction, to this point, is local. Accordingly, the process of displaying the requested data, such as a web page, on computer 100 is accelerated as the waits, due to network latency and network interface bandwidth limitations, associated with the data exchanges over the network are not experienced.

Figure 5:
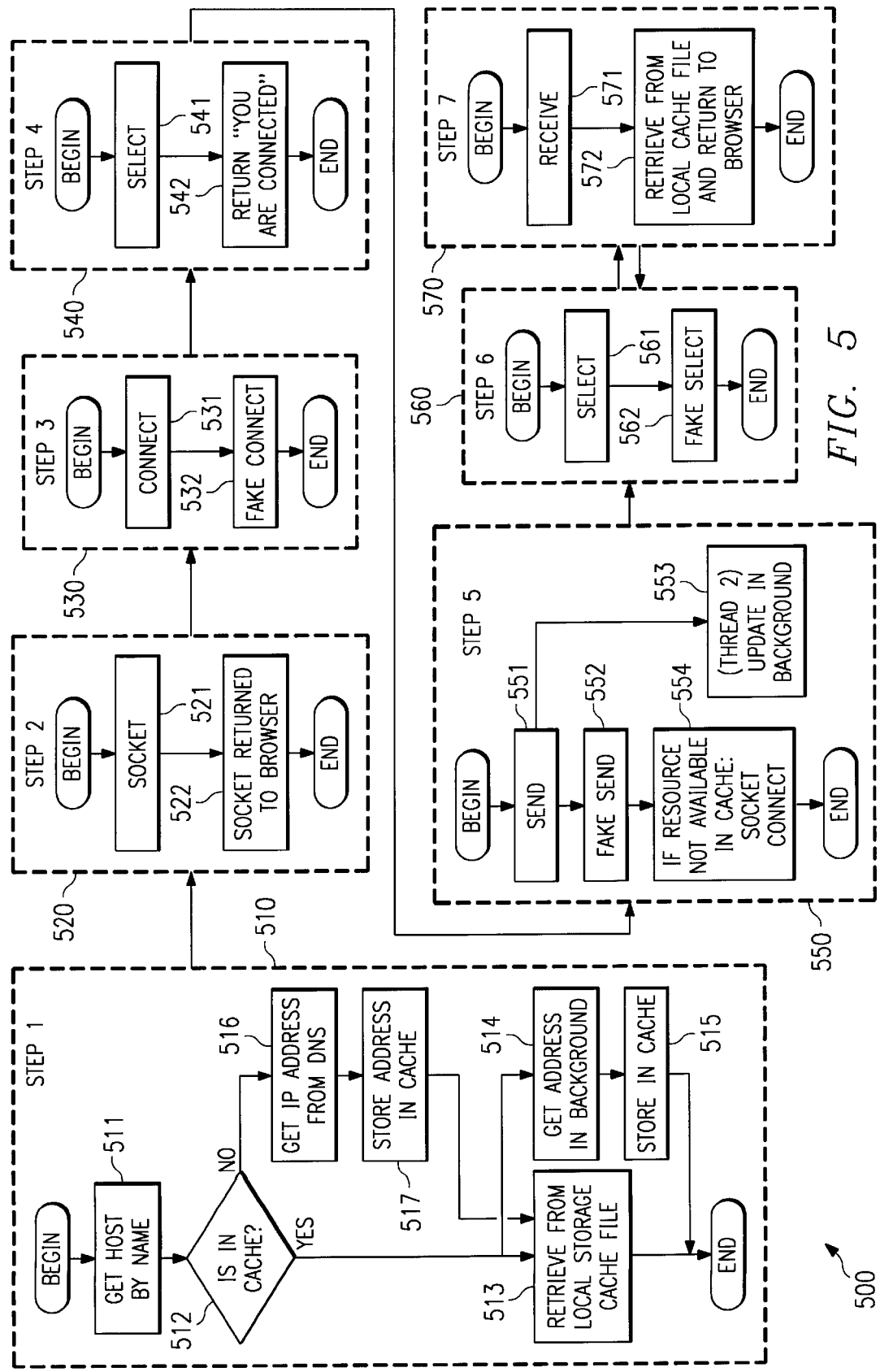
FIG. 5 is a flow chart indicating the sequence of steps that a web browser implements according to the preferred embodiment of the intelligent cache of the present invention shown in FIG. 4.

Directing attention to FIG. 5, a flow diagram, similar to that of FIG. 3, may be seen. The flow diagram of FIG. 5 indicates the sequence of steps that a preferred embodiment of modified network user interface 400 implements. At step 510 the software call "GET HOST BY NAME" is issued (substep 511). As with the prior art system, this calls for converting the site name into the TCP/IP address. In accordance with the present invention, computer 100 first checks to see if the requested address already exists in a local cache (substep 512). If the address does exist in the local cache, then the address is immediately retrieved from storage in the cache as indicated by substep 513.

Additionally, while the TCP/IP address is being returned to browser 201 from the local cache, a second thread is spawned which, in the background, communicates with a server, such as DNS server 122 of FIG. 1, to verify that the TCP/IP address has not changed since its storage in cache (substep 514). By "in the background" it is meant that this operation occurs on a separate thread, and without intervention by web browser 201.

In the preferred embodiment, this second thread involves the second Winsock library, interposed between the web browser and the original Winsock library, issuing the software call "GET HOST BY NAME" to the original Winsock library. This original Winsock library will respond as if called by the web browser and retrieve the TCP/IP address from the network as described above with respect to step 310 of FIG. 3. However, instead of the returned address being reported to the web browser, the present invention operates to accept the information and act accordingly.

The updated data from server 122 is stored in the cache (substep 515) so as to have only the most current information stored locally. Although there is typically no change in this address data, if the TCP/IP address is determined to have changed, the present invention may operate to inform the user or may automatically interrupt processing of the old TCP/IP address in favor of processing the new TCP/IP address (both substeps not shown).

If the address is not in the cache, the site name is converted to a TCP/IP address by a server, such as DNS server 122 of FIG. 1 (substep 516). Because this site name has not been connected before, or sufficient time has elapsed so as to eliminate its entry from cache, it is necessary to send it over the network for translation and, accordingly, to pay the price in waiting time due to network latency and modem bandwidth. Once received, the TCP/IP address corresponding to the site name is stored in the cache of computer 100 in order that future connections to this particular server may be accelerated (substep 517).

With continuing reference to FIG. 5, at step 520 the call "SOCKET" is issued (substep 520). Successful execution of the call will result in a socket, referred to herein as socket 1, returned to the browser (substep 522). A socket is a logical handle, or a means to hook into the software.

Step 530 issues a "CONNECT" command (substep 531). This command of the modified network user interface, requesting connection of socket 1 to the TCP/IP address, emulates a connection between the server and client (substep 532). In accordance with the present invention, this step differs from the corresponding step in FIG. 3 in that the connection is simulated. Socket 1 is not actually connected to the TCP/IP address.

Step 540 issues a "SELECT" command (substep 541). Thereafter, in accordance with the present invention, a false message is returned immediately stating that a connection exists from socket 1 to the TCP/IP address (substep 542). In contrast, the prior art system of FIG. 3 will return a message of "There is no connection—wait" until such time as the connection is actually established or a time-out is reached.

In the improved system of FIG. 5, the message "You are connected" is immediately returned. Thus, there is no wait, and the application moves immediately to step 550. If desired, this message could be modified for "You are connected to the cache".

Further processing according to the modified network user interface of the present invention depends on the availability of the desired resources in computer 100's local cache. Specifically, if the desired resources have been accessed by the user previously, and are stored in the local cache, processing proceeds differently than if there has been no access by the user and, accordingly, the resources are not available in the local cache.

Resources Available in the Cache

In this example, it is assumed that the particular web page has been accessed before, and that the resources associated with that page have been downloaded into a local storage cache in computer 100.

In step 550 the command "SEND", as described above with respect to step 350, is issued (substep 351). This command is issued by the browser 201 on socket 1 (ostensibly to the TCP/IP address associated with the web page) asking to get a particular resource. However, the present invention operates to intercept the "SEND" call and immediately returns results to browser 201 (substep 352). Accordingly, browser 201 receives a message in return "Okay—the message has been sent to the server", although no message has in fact been sent. As will be explained hereinafter, also occurring at step 550 is the spawning of a separate thread in the background, thread 2, that communicates over the network to update the resource from the actual TCP/IP address (substep 553).

Independently, thread 2 is getting the resource over the network in the background. This is done to update the cache. In the preferred embodiment, this second thread involves the second Winsock library, interposed between the web browser and the original Winsock library, issuing the software call GET <resource> to the original Winsock library. This original Winsock library will respond as if called by the web browser and retrieve the desired resource from the network by establishing a socket, socket 2, connecting to socket 2, and receiving the desired data from the server, as described above with respect to steps 320 through 370 of FIG. 3. However, instead of the returned resource, or resources, being reported to the web browser, thread 2 operates to put the updated resource in a different location in the cache. The updated data is then compared with the older data. If the data has changed, computer 100 issues an alert, such as a beep or tone, to notify the user. The user can then press the refresh key and obtain the updated data. The updated data may be provided to the browser through the present invention operating to connect the browser to a local host, i.e. the cache storing the updated data, as is described in detail below with respect to providing data when not available in the local cache. If desired, the updated information can be used without intervention by the user and a "data updated" message can be displayed so the user knows that he/she has the cached data available. Once the updated information is made available to the user, the old cache is eliminated.

It shall be appreciated, although it is described above that the resource is downloaded for comparison with the data in cache, that the present invention may operate to issue a GET <resource> request to the server with an If-Modified-Since: <date/time of modification> tag, or similar set of instructions. Accordingly, the server will download the resource only if the resource has been modified since the stamp indicated in the If-Modified-Since tag. If the resource has not been modified, the server responds with a Not Modified code indicating that the copy of the resource in the cache does not require updating.

At step 560 the present invention operates to issue a "SELECT" call on socket 1 (ostensibly to the TCP/IP address associated with the web page) (substep 561). The "SELECT" call is normally used to detect that new data has arrived over the network. However, according to the present invention, the browser promptly receives a message that information is available (substep 562). Thus, there is no wait, and the application moves immediately to step 570.

At step 570, "RECEIVE" is sent to initiate downloading of the desired resource (substep 571). Thereafter, data is received, not from the host, but out of the local cache in computer 100 and given directly to the browser (substep 572).

Thus, in accordance with the principles of the present invention, all three of the aforementioned wait times have been eliminated when presenting information to the user which is available in cache. With respect to step 510, the address translation, the TCP/IP address is stored in cache, so that it is instantly given to the user upon request. At steps 530 and 540, the wait time is avoided by falsely reporting establishing a connection. Likewise, at step 560, when the resource is in the cache, the data is promptly provided to the browser directly out of the cache. Accordingly, substantially all of the network delays have been eliminated in presenting information to the user, while still providing for the presentation of updated information acquired over the network.

From the foregoing, it shall be appreciated that when employing the present invention, graphics, and other data objects, are caused to load more quickly than occurs when using conventional browsing and downloading from network devices. In accordance with the present invention, each graphic is searched separately and is loaded from the user's storage cache rather than from the network. The result being that desired information, such as a web site page, is immediately presented to the user.

Since certain information is more likely to have changed than other information, it is possible, if desired, to deliver the most "stable" information first, while in the background obtaining any new or modified data, which then could be used directly.

In the foregoing example it was assumed that the particular site address had been visited before and that the resource was available in the cache. In the following example it is assumed that the desired resource is not available in the cache.

When the Resource is not in the Cache

When the resource is not available in the cache, steps 510 through 540 are preferably performed as discussed above. Accordingly, even though a resource is not immediately available, at step 540 the message returned is "You are connected", and the application moves immediately to step 550.

However, it shall be appreciated that the connection with the host at this point has only been simulated. In reality there is no connection from socket 1 to the TCP/IP address of the server on the network. From the viewpoint of browser 201, there is a connection, and browser 201 issues a "SEND" (substep 551). Nothing can be read by the browser because there is nothing in the cache. Likewise, no commands or messages can be sent to the server because socket 1 is not actually connected to the server.

In accordance with the invention, a new socket 3 is created on thread 1 (substep 551). This new socket 3 is a local socket connected to a local host. Socket 3 is on the local computer 100, but it emulates a TCP/IP address on the Internet 120. A connection between socket 1 and socket 3 is established immediately at step 554. This is a local connection, but it simulates connecting socket 1 to a TCP/IP address over the network. The connection is established instantly because it is local, i.e., there is no wait.

Thereafter, when the user issues "SELECT" at step 560 on socket 1, the command is interpreted by the present invention as "SELECT" at socket 3. Accordingly, browser 201 appears to be connected over the network, such as Internet 120, but in reality it is connected locally.

Thread 2 creates socket 2, issues a real "CONNECT" to the server at the TCP/IP address, waits for the connection to be made, does a "SELECT", and waits for data (substep 553). The steps performed by thread 2 are illustrated in FIG. 6 where substep 553 of FIG. 5 is shown to include steps 620–670.

Because no data is available in the local cache to present to the user, while the above activity takes place on thread 2, thread 1 is waiting. There is nothing in the cache, there is no data at socket 3. (It, of course, could be desired to provide an alternate message to the user at this time until new data arrives). Socket 3 is effectively asleep at step 560, but can be awakened by the transmission of one data byte.

When the server returns data representing the requested resource to the client, socket 2 on thread 2 is awakened. Thread 2 places data representing the resource in a cache and sends one byte to socket 3. This wakes up socket 3 on thread 1. When socket 3 is awakened, the "RECEIVE" command (step 570) automatically gets the data from the cache. Thereafter, the data is presented to the user.

It shall be appreciated that the steps of thread 2, step 620 creating a socket, step 630 connecting, step 640 issuing a select, step 650 issuing a send, and steps 660 and 670 operating to receive data, are substantially as described above with respect to steps 320–370 of FIG. 3. This is because the preferred embodiment of the present invention operates to connect to, and download information from, a server utilizing existing portions of the network user interface, which in the above example is the original Winsock library. Accordingly, it becomes clear that the preferred embodiment's interposing of the new Winsock library between the browser and the original Winsock library allows the new Winsock library to emulate network connection while allowing the original Winsock library to actually accomplish network connections as needed.

Intelligent Fetch

In the conventional method of network browsing, the user sends a request to browse a particular resource or set of resources, such as a web site. Upon selection of the resource, the user must typically wait for a considerable length of time before being presented with the desired information.

Using again our Internet example, the first page downloaded is the HTML page which indicates the layout of data on a page. Code in the HTML page defines every part to be downloaded including the hypertext links. The HTML pattern is repeated over and over for each portion. As the user waits, the first page takes form piece by piece.

This page may include a number of hypertext links, i.e., buttons or links to additional or associated information. When the user selects a link, such as by clicking on it with a mouse, the computer goes to the appropriate page, i.e., loads the resources associated with the selected link. There may be as many as 20 or 30 links on a page. The user is delayed after selecting a link waiting for the linked page to be downloaded. However, it shall be appreciated that while a user is viewing the information presented by a current page, the network interface is typically idle, or at least not used at capacity.

The intelligent fetch feature of the present invention pre-loads information associated with a currently selected resource, such as the resources of hypertext links displayed on a current web page, in order that when the user accesses this information, it is displayed immediately instead of waiting to download it when selected. Accordingly, while the user is viewing or otherwise assimilating current information, the present invention operates in the background to fetch associated information which is likely to be selected.

However, as it is likely that there will be sufficient associated information to require background downloading time in excess of the time required for the user to assimilate the currently displayed information, the present invention operates to intelligently select information to pre-load. Preferably, information previously accessed by the user, such as previously used links, are remembered in a knowledge base such as might be stored in a memory or disk of computer 100. As it is likely that this previously accessed information is again information which the user will desire to access, this information is pre-loaded first.

Accordingly, in the Internet example the intelligent fetch aspect of the invention permits the user to utilize a particular web page, while, in the background, the present invention pre-fetches all the associated hypertext links that are present on that page that can be downloaded before the user selects a link. The order of download is intelligently selected by the present invention to maximize the possibility of completing a background download of the link next to be selected. As described above this is preferably accomplished using a knowledge base of links previously accessed by the user in order to first pre-fetch the links that a user has visited previously and, thereafter, pre-fetch the links that the user has never seen before. Moreover, the odds may be further increased through the use of a statistical engine, such as a statistical algorithm operable on computer 100, possibly utilizing the aforementioned knowledge base, making determinations such as a length of time since the user's last access, weighted averages of user's access, detection of patterns with respect to user access, and the like. Additionally, the statistical engine may make predictions as to what links a user might select next based on historical information such as key words in the links or resources, relationship of the link to the present page, including location of the link on the page, and number of times the link is presented on the page, and the like. Accordingly, when the user ultimately selects one of the available links, it is very likely that the page is already in the pre-fetch cache, ready for immediate presentation.

Figure 7:
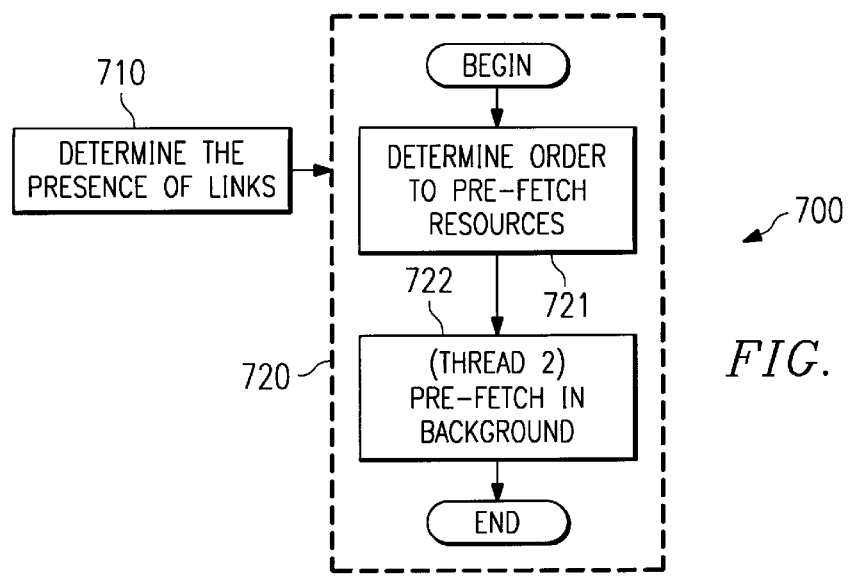
FIG. 7 is a flow chart indicating the sequence of steps that a web browser implements according to the preferred embodiment of the intelligent fetch of the present invention shown in FIG. 4.

The foregoing may be accomplished as set forth hereinbelow and as illustrated in FIG. 7. The HTML page describes all of the graphics on the page, i.e., what the page looks like, as well as describing the hypertext links. There are particular codes in the HTML page that describes the hypertext links. These codes define interaction such that if the user selects a link, such as by clicking a mouse curser on certain words or images, on the gateway page, a different page will be accessed. Typically, the browser automatically identifies these links, such as by underlining the words or putting the words in blue, etcetera.

As the HTML page is downloaded, the software of the present invention determines the presence of links (step 710), such as through recognizing the aforementioned special codes. Of course, the information to be pre-loaded may be determined through other means, such as identifying a next record in a database or the like, if desired or appropriate.

Once the information to be pre-loaded is determined, the present invention operates to spawn another thread to pre-fetch the information (step 720). This additional thread preferably is statistically the same as thread 2, shown in FIG. 6, utilized to download information not available in cache with the additional step of determining the order of the resources to fetch conducted prior to retrieving resources. Preferably, all of the links are examined and their loading prioritizes according to the aforementioned determinations as to the most likely to be accessed by the user (substep 721).

Thereafter, during presentation of currently selected information, thread 2 (substep 722) is requested to pre-load links. Accordingly, thread 2 operates to retrieve the resources of the links, in the order determined to most likely pre-load those resources the user will use first, in the background. For example, the intelligent pre-fetch first pre-loads pages that have been visited before, i.e., pages that are present in the primary cache. Second, the intelligent pre-fetch pre-loads pages that have not been visited before.

Pages that have not been visited before are preferably placed in a different cache called the pre-fetch cache. The pre-fetch cache may then be deleted when the browser exits. If any page in the pre-fetch cache is actually accessed by the user during the session, that page is moved into the primary cache. Accordingly, it will be seen that the primary cache stays on disc, while the pre-fetch cache gets deleted when the browser exits, thus maintaining the distinction between accessed information and that merely pre-loaded in anticipation of user access.

It shall be appreciated that thread 2 is used for many different purposes. One of those purposes is to get updated data in the background, and another one is to pre-fetch links. So, thread 2 is requested to pre-load links.

Download Priorities

In accordance with the preferred embodiment of the present invention, thread download priority is provided. That is, certain downloading activities take precedence over other downloading activities. Of course, there may be any number of reasons to give a particular resource or type of resource priority and, accordingly, the present invention is not limited to assignment of priorities as identified herein.

Priority 1 is foreground priority. Foreground priority is the first or highest download priority. Foreground priority is a resource for which the user is currently waiting that is not in the local cache. Thus, the user is staring at a blank screen while waiting for a foreground priority. In contrast, background priority is where the data is in the cache but it may be un-updated data.

Priority 2 is a background priority such as for loading HTML pages. It will be recalled, from earlier descriptions hereinabove, that while the user views data obtained from the cache, thread 2 downloads resources in the background. When those resources being downloaded by thread 2 are HTML pages, they are categorized as priority 2.

In our Internet example there are many types of resources: HTML, text, graphics, ads, cookies, and others. However, of background resources, HTML is preferably given the highest priority. This is because HTML defines the nature of all of the non-HTML data and, therefore, is typically necessary in order to properly utilize the other resources.

Priority 3 is a lower background priority, such as for downloading non-HTML background data. These are resources being downloaded by thread 2 that are not HTML pages and, therefore, are given a lower priority than the HTML pages.

It shall be appreciated that a resources priority level may be changed to reflect dynamic changes in the network interaction. Such as network dynamics, including availability of resources etcetera, or user dynamics, including user issued command changes. For example, if the user were to request refresh for a given resource while it was being downloaded in the background by thread 2, its priority might be changed from priority 3 to priority 1, foreground priority, because the user is currently waiting for the data.

Priority 4 is a very low background priority, typically utilized by functions not directly related to the information currently selected. Preferably, pre-fetching of previously accessed pages or resources identified or associated with the currently selected information, i.e., links appearing on a current web page, are downloaded at priority level 4. Accordingly, resources which are determined to be most likely to be accessed by a user may be downloaded, or updated as the resource is preferably already in the local cache because of computer 100 having previously accessed the resource, after all downloads associated with the currently selected resource and before resources determined to be less likely to be accessed by the user.

Priority 5 is another very low background priority, also typically utilized by functions not directly related to the information currently selected. Preferably, pre-fetching of never before accessed, or accessed sufficiently long ago to have been removed from local cache, by a user may be downloaded after all downloads associated with the currently selected resource and after resources determined to be more likely to be accessed by the user.

Preferably, any download that needs to occur waits for downloads of higher priority to finish. If a higher priority download is issued after a lower priority download is taking place, only the lowest priority downloads, priority 4 and priority 5, get canceled and put back in the queue. Of course, additional threads may be spawned to concurrently perform multiple downloads, if desired. However, as it is expected that only a single network interface will typically be available, time division multiple access, or other multiple access schemes, required to share a single network interface will operate to slow both data exchanges resulting in a total time to load both substantially the same in either case.

Ad Filter

The ad filter or ad blocking feature of the present invention recognizes unnecessary or undesired information exchange, such as Internet advertising patterns and code, and permits loading desired information more rapidly by not downloading and/or displaying the unnecessary information. For example, when accessing the Internet, instead of an ad, a blank space or selected library graphic or a message, such as an identifier of the ad filtered, may be presented to the user. Of course, the user can view ads by disabling the filter or by selecting the particular filtered resource for display, such as by selecting a message presenting the filtered ad identifier, if desired. It shall be appreciated that, although the inventive filter described herein is discussed with respect to "ads," the filter may be utilized to avoid any form of identifiable information.

The ad filter is especially advantageous in the Internet environment as most ads are graphics, consisting of a substantial amount of information. Accordingly, filtering of these resources relieves the system of significant online time required to download the resources, as well as local resources involved in storing and presenting the undesired information.

The ad filter is preferably implemented by first compiling an ad list such as might be stored in a memory or disk of computer 100. This ad list may be a knowledge base complied by the user's own system as the system experiences the undesired information in typical use. Additionally, or alternatively, the ad list may be compiled by a central source, such as a service identifying ads, or other undesired information, on the network. If compiled by a central source, the ad list may be periodically transmitted to the user's computer or may be accessed over the network as needed.

Figure 8:
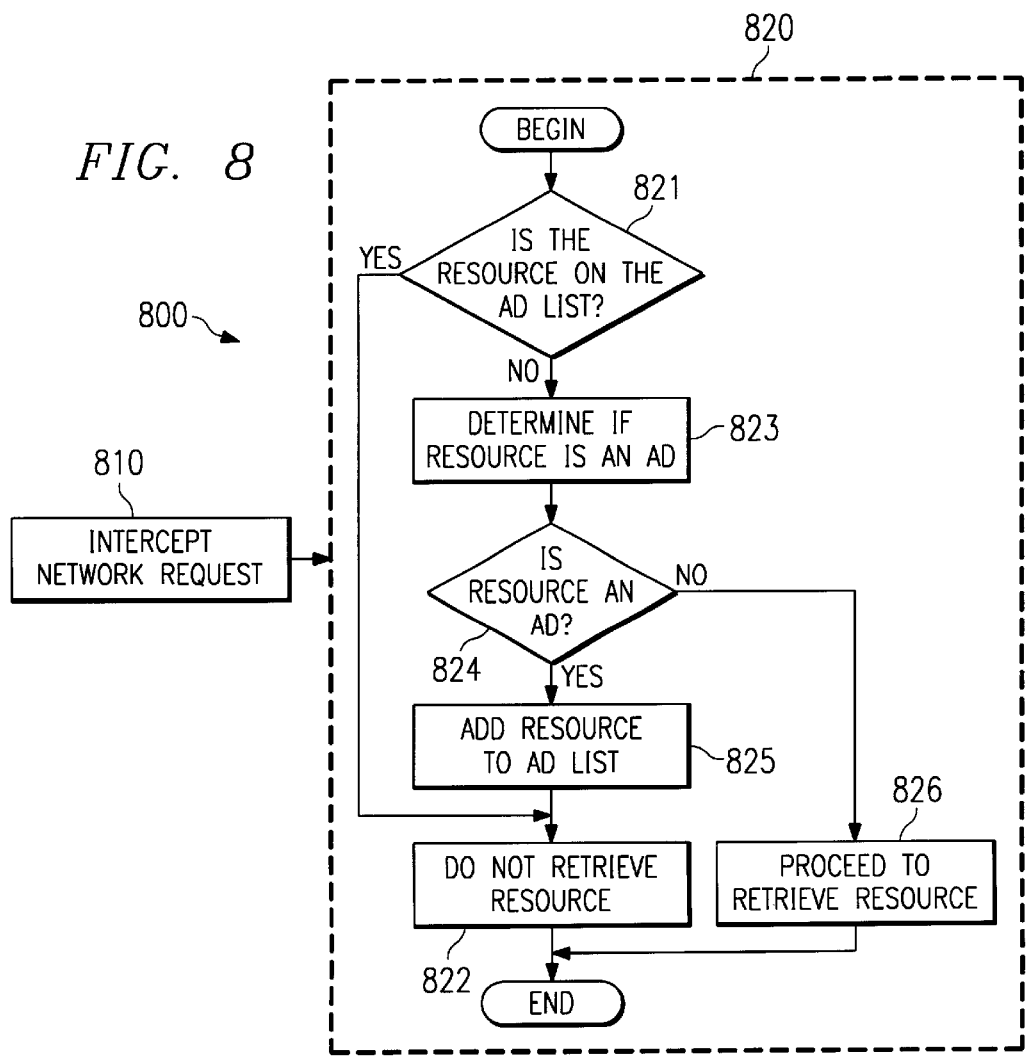
FIG. 8 is a flow chart indicating the sequence of steps that a web browser implements according to the preferred embodiment of the ad filter of the present invention shown in FIG. 4.

In operation, as illustrated in the preferred embodiment of FIG. 8, when a request is issued (step 810), a comparison is preferably first made (step 820) with the ad list to determine if the requested resource is on the ad list (substep 821). If the resource is on the list, its download is avoided (substep 822). Instead, a void may be left in the information presented to the user or, as described above, a locally available graphic or message may be presented. Additionally, or alternatively, an identifier, such as the URL of the ad, may be presented to the user allowing the user to selectively receive the ad, if desired.

However, if the resource is not in the ad list, it still may in fact be an ad. Accordingly, the present invention preferably proceeds to determine if the resource is an ad (substeps 823 and 824). If such a determination is made, in addition to avoiding the downloading and displaying of the resource (substep 822), identification information of the resource is preferably added to the ad list to expedite its omission in the future (substep 825), otherwise the resource is retrieved as normal (substep 826).

There are several ways to identify what resources are desired and which are not, i.e., which resource is an ad and which is not an ad. In the Internet example, the file name extensions are typically all the same, such as each graphic having a file name extension of ".GIF". Accordingly, it is often difficult to determine undesired information simply from a file name or file name extension. Moreover, there is nothing in the HTTP protocol that distinguishes a file as between being an ad or being a regular graphic.

Figure 9:
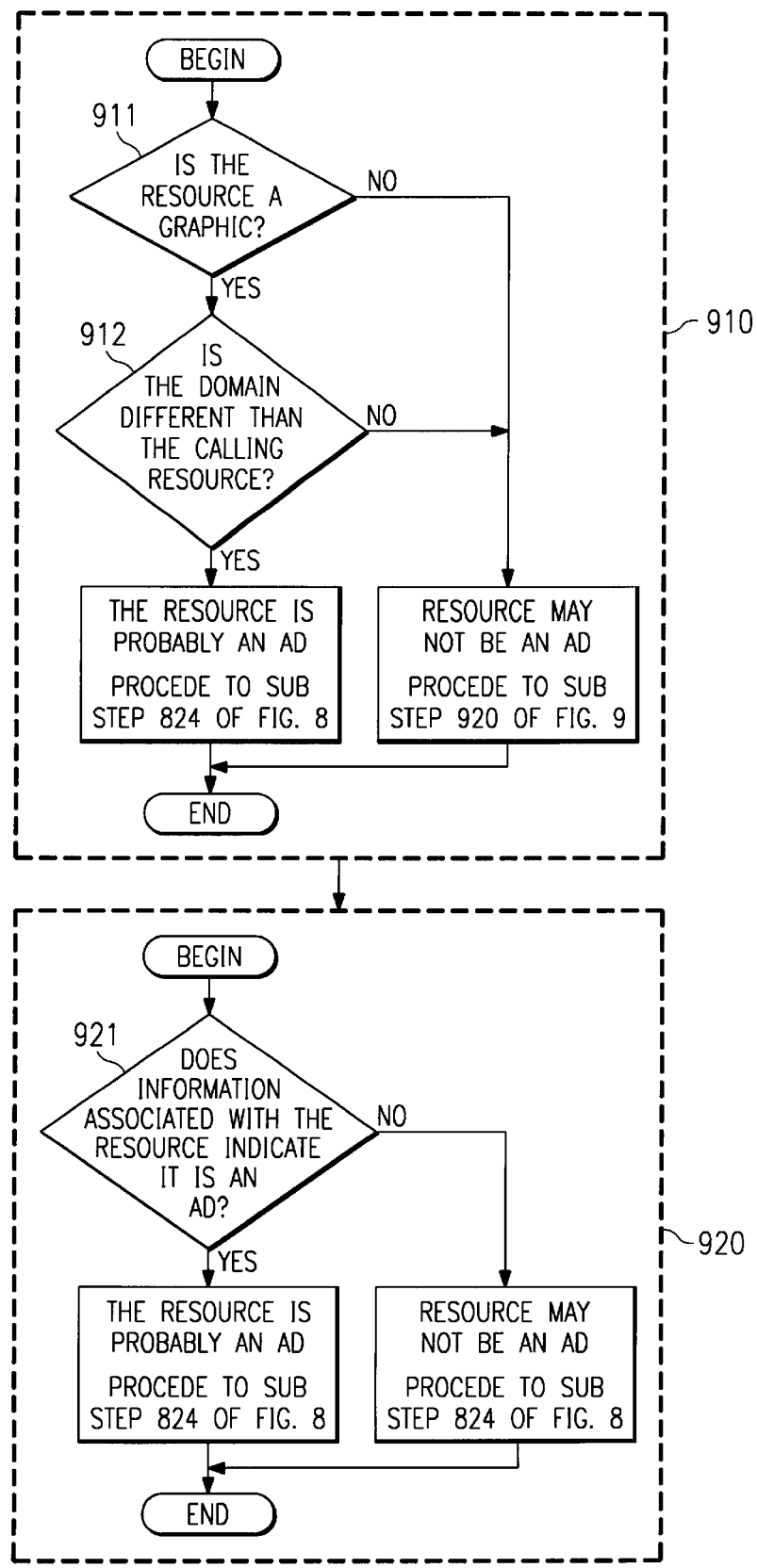
FIG. 9 is a detailed flow diagram of the steps used to determine if a resource is an ad according to a preferred embodiment of the present invention.

Accordingly, a test for identifying what is an ad and what is not an ad according to the present invention is to look at the address for a graphic image, as illustrated in step 910 of FIG. 9, showing steps of substep 823 of FIG. 8. If it is a graphic (substep 911) and its address identifies it as from a domain that is not local to the page calling the resource, it may generally be assumed to be an ad (substep 912). Accordingly, this resource may be identified as an ad in the ad list and it will be hidden if the user enables the ad filter, such as through selection of a "HIDE AD" feature.

For example, a typical page address may appear as "www.xyzcorp.com/cirl/page.htm". The portion of the address "/cirl/page.htm" is a resource. Whereas, the portion "www.xyzcorp.com" is the site address. The portion "xyzcorp.com" to the left of "www." is the domain name and belongs to the web site owner, in this case XYZ Corporation. The three w's (www), stand for the World Wide Web which is a defined networking convention. Part of that convention is the address naming convention described above. Because of this address naming convention it is possible to make certain determinations as to each resource by its address, such as its origination from a domain different than that of the page calling the resource.

Another test for identifying undesired information according to the present invention (step 920), is to examine the information to the left of the domain (substep 921). By looking for a match with certain information determined to be indicative of undesired information, such as the aforementioned undesired ads, the determination may be made. For example, if the information to the left of the domain includes "ad", "ads", "/ads", "ad/", "ads/", a "sponsor" or a "banner" it may be assumed that the resource is an ad and is not desired. Likewise, if the information to the left of the domain, or the domain itself, includes particular information determined to be associated with ads, such as a particular advertising company's name or the like, it may be assumed that the resource is an and is not desired.

If, in the first test, it is found that the graphic image comes from a domain that is different from the domain of the page, preferably the second of the above tests is avoided. However, if the first test is negative, i.e., both the page and the resource are in the same domain, then the ad filter software proceeds to the second test.

In the Internet example, the foregoing preferably occurs only if the page is an HTML page. This is because if it is not an HTML page, there is nothing to examine as images are described only on an HTML page. The ad filter software follows all tags that point to graphics. It identifies everything that it can make an examination of. Accordingly, when computer 100 is displaying a HTML page, browser 201 sees the tags of all the resources, and then at a later time, issues a request to download the resources. However, if an image is determined to be an ad according to the present invention, its resource name is put on a list of ads and the resource is not downloaded when requested by the browser.

Accordingly, when a request is issued for a resource, i.e., the request at step 550 "SEND" (GET RESOURCE), is issued, the ad filter makes a comparison to determine if the resource is on the ad list. If there is no match, the system continues operation as normal. However, if a match is made, the ad filter immediately returns to the user an HTTP command that says "not found", such as in step 570, when the call "RECEIVE" is issued instead retrieving the actual image. Thus, instead of the ad, a blank space appears on the screen.

There are ad networks that provide ads for web sites which are merely inserted in web pages as presented by the particular web site. Accordingly, there is very little these ad networks can do to mask their ads from the ad filter because the ad network's ads are going to be in a different domain than the page in which the ads appear.

However, some web pages don't use ad networks. Instead, they may use their own ads, such as might be generated by an internal ad department. Typically, these ads are native to the same site and, therefore, are in the same domain. However, often these ads are placed in directories which are readily identifiable, such as named "ads", so the ad filter software is able to identify them as described above.

Cookie Filter

In the Internet the transfer of cookies takes place as part of the HTTP transaction process, and is no more obvious than an HTML file download. A cookie is a few lines of text that is part of an HTTP transaction. When the user accesses a site that uses a cookie, the server transmits the cookie to the browser along with the rest of the HTML document that was requested. The browser stores the information on the hard disk of the user computer. When the user returns to that web site, the cookie is transmitted back to the server, which, in turn, may then send an updated cookie.

Cookies are frequently used for tracking users. Since it is possible to identify users with a unique cookie, the web site administrator can easily tell when users return to their web sites, such as for statistical or demographic information. Advertisers and marketing people are interested in how visitors navigate around their sites, which pages they visit most frequently, how they enter those pages, and whether navigation can be made more efficient. Cookies can track this kind of information on a user-by-user basis.

For example, when a site, utilizing ads come from an ad network as described above, downloads resources the desired information is served up from the selected domain address, and the ads are served up from a different domain address. The ads are served up via a link to the ad network that serves up the ads. Often the ad network assigns to each user a unique user ID, and sends a cookie to the user whenever the browser accesses that site. When the user revisits that site, the browser gives the cookie back to the ad network server. Accordingly, the visited site knows that the user has returned to the same site that it visited before.

Moreover, additional information may be provided by the cookie exchange. For example, it may be determined which domain or page the user is coming from to access the ad network. The cookie may include a referrer field, i.e., "Which page sent you?". Likewise, the cookie may include an identifier field, i.e., unique network user identification information. When the user visits a different site, that site will know who the user is, and that the user just visited the ad network site. Although the servers typically will not know anything about the user personally, many users find this problematic from the privacy point of view. Some users do not want to be tracked across different Web sites.

Figure 10:
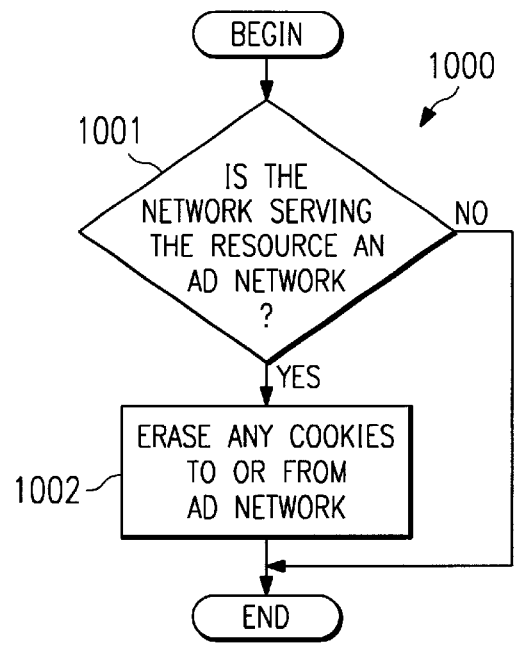
FIG. 10 is a flow diagram indicating the sequence of steps that a web browser implements according to the preferred embodiment of the cookie filter of the present invention shown in FIG. 4.

In accordance with the present invention, there is provided a cookie filter feature, such as that illustrated in the preferred embodiment of FIG. 10. The cookie filter feature preferably employs some features of the aforementioned ad filter.

The ad filter software identifies ad networks. Accordingly, the cookie filter may use this information in filtering undesired cookies (step 1001). For example, if a graphic image is located on a site in a different domain than the page, it is presumed to be an ad served up by an ad network. Accordingly, when the ad network attempts to send a cookie, typically an HTTP "SEND COOKIE" command, the cookie filter of the present invention operates to erase it (step 1002). Preferably, the cookie filter erases the transmission of a cookie in either direction, from the ad network, and to the ad network.

In operation, when the user connects to a particular site, the user is served an HTML page having tags that identify the images. Employing the ad filter described hereinabove, ones of the resources are identified as ads that come from an ad network. These resources are put on the ad list, as described hereinabove. When the browser makes a request to download a resource, it will be identified as to whether it is an ad from an ad network. In accordance with the invention, the cookie filter software will identify whether there is a cookie tag, the cookie will be identified in the HTTP header, when the request for the resource is made. Accordingly, the cookie filter identifies the cookie is unwanted, i.e., a cookie from an ad network, and eliminates the cookie tag. The cookie filter takes everything before the cookie, and everything after the cookie, combines it and sends it to the server. However, the cookie simply never gets sent.

It shall be appreciated that there are some cookies that are desirable. For example, some cookies may be utilized to automatically establish user preferences, account numbers, passwords, and the like. Accordingly, the preferred embodiment of the present invention operates an intelligent cookie filter in order to filter only cookies identified as undesirable cookies, such as the aforementioned ad cookies, by associating the cookie with a particular resource, such as the aforementioned ad network. Of course, the cookie filter may operate to filter all cookies or cookies other than the aforementioned ad cookies identifiable as undesirable, if desired. For example, domain names, or other identifying information, may be used to determine undesired cookies. Likewise, a particular page resource, or software call, such as a particular HTML call, occurring in a particular context with respect to a cookie identifier may be used to identify undesired cookies for filtering.

It shall be appreciated that ones of the various features, discussed above, may be deployed in a modified network user interface, as desired. For example, the intelligent cache and intelligent fetch features may be utilized without the ad or cookie filters, if desired. Likewise, any of the features may be utilized without the remaining features, if desired. However, in order to achieve the maximum acceleration of network interaction, the preferred embodiment of the present invention includes all the above-described features.

Figure 11:
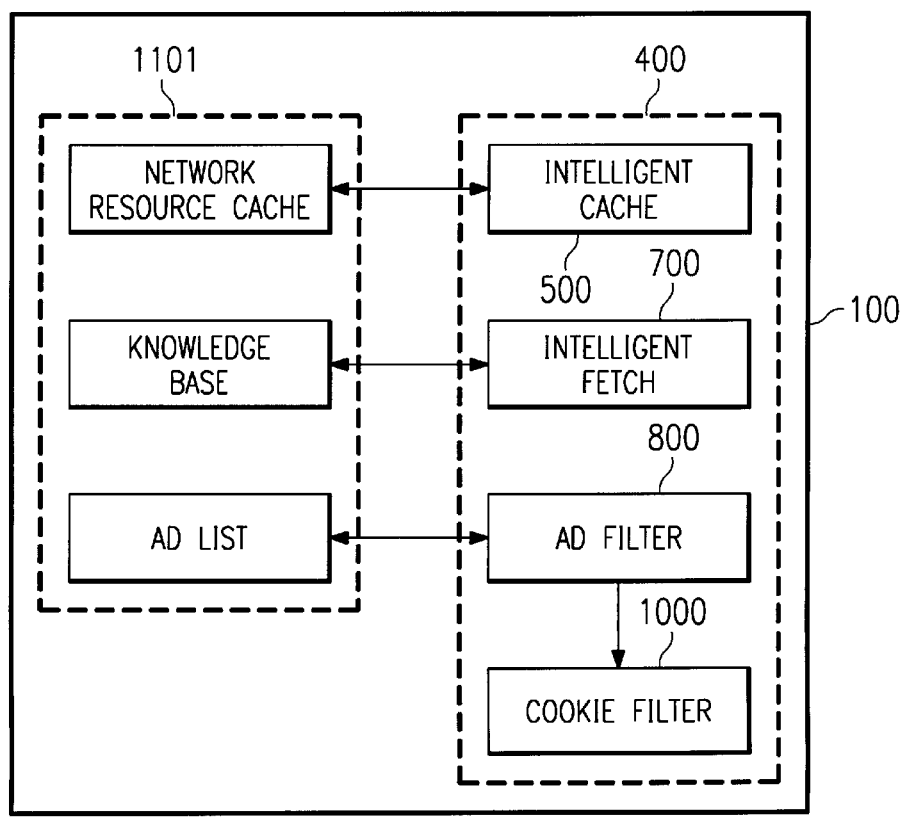
FIG. 11 shows a block diagram of a preferred embodiment of the present invention including intelligent cache, intelligent fetch, ad filter and cookie filter features.

Directing attention to FIG. 11, there is shown computer 100 having network user interface 1100 and storage media 1101, which might be a disk or random access memory (RAM), or a combination thereof, disposed therein. User interface 400 is adapted to include intelligent cache 500, intelligent Fetch 700, ad filter 800, and cookie filter 1000, all as described above, to provide a preferred embodiment of the present invention.

Although the present invention and its advantages have been described in detail, it should be understood that various changes, substitutions and alterations can be made herein without departing from the spirit and scope of the invention as defined by the appended claims. The foregoing description of the preferred embodiments of the present invention have been presented for purposes of illustration and description. It is not intended to be exhaustive or to limit the invention to the precise form disclosed. The embodiments were chosen and described in order to best explain the principles of the invention and its practical application, thereby enabling others skilled in the art to understand the invention for various embodiments and with various modifications as are suited to the particular use contemplated.

What is claimed is:

1. A system for providing accelerated network interaction as experienced by a user of a processor-based system operating under control of a network user interface, said processor-based system coupled to a data communication network having a plurality of network devices coupled thereto, wherein said processor-based system includes a pool of resources previously accessed via said data communication network, said system comprising:

means for emulating interaction of said network user interface with said data communication network;

means operable under control of said emulating means for substantially immediately presenting resources presently desired to said user from said pool without first determining if a later version of said resource is available over said communication network;

means operable under control of said emulating means for retrieving from said data communication network said resources presently desired if a later version of said resource is available over said communication network, and wherein said emulating means comprises an instruction set providing responses expected by said network user interface substantially immediately in response to calls for interaction with said data communication network, said instruction set subsequently determining how to properly service said calls and operating with said presenting means and said retrieving means accordingly.

2. The system of claim 1, wherein said retrieval of said resources is a background task of said processor-based system, and wherein said presenting of said resources presently desired is a foreground task of said processor-based system.

3. The system of claim 1, wherein said retrieving means operates to up-date said presently desired ones of said resources of said pool.

4. The system of claim 3, further comprising:

means for notifying said user of the availability of an up-dated resource retrieved from said data communication network.

5. The system of claim 3, further comprising:

means for automatically presenting to said user an up-dated resource retrieved from said data communication network.

6. The system of claim 1, wherein said instruction set provides said responses expected by said network user interface regardless of a current status of said data communication network and said pool.

7. The system of claim 6, wherein said instruction set includes a software call library interposed between an original software call library adapted to respond to calls for interaction with said communication network and said network user interface, and wherein said retrieving means comprises said original software call library.

8. The system of claim 1, further comprising:

means for pooling network address name set information to provide conversion of network address names to network addresses without requiring data communication network interaction; and means for verifying from said data communication network a selected one of said network addresses and for retrieving said network address if determined to be erroneous by said verifying means.

9. The system of claim 1, further comprising:

means for retrieving from said data communication network selected resources associated with said presently desired resources, said associated resources being resources not currently desired by said user, wherein said associated resources retrieving means operates to retrieve said associated resources at a priority lower than that of said presently desired resources retrieving means.

10. The system of claim 9, wherein said associated resources retrieving means comprises:

means for determining said resources associated with said presently desired resources most likely to be desired by said user in the future.

11. The system of claim 10, wherein said determining means includes means for determining resources which have been previously accessed by said user.

12. The system of claim 10, wherein said determining means includes means for utilizing statistical information with respect to said user interacting with said data communication network.

13. The system of claim 1, further comprising:

means for automatically avoiding retrieval of certain categories of resources.

14. The system of claim 13, wherein at least one of said certain categories are advertisements.

15. The system of claim 13, wherein said retrieval avoiding means comprises:

means for identifying a plurality of resources previously determined to be included in said certain categories of resources.

16. The system of claim 13, wherein said retrieval avoiding means comprises:

means for determining if said particular resource is provided by a network location different than a network location of a presently desired resource, wherein said retrieval avoiding means operates to avoid retrieval of said particular resource if determined to be a graphic resource and determined to be provided by a network location different than a presently desired resource.

17. The system of claim 16, wherein said retrieval avoiding means further comprises:

means for determining if a particular resource to be retrieved is a graphic resource.

18. The system of claim 17, wherein said retrieval avoiding means comprises:

means for identifying a plurality of resources previously determined to be a graphic resource and to be provided by a network location different than a presently desired resource by said determining means.

19. The system of claim 13, wherein said retrieval avoiding means comprises:

means for determining if said particular resource includes attributes indicative of an undesired resource, wherein said retrieval avoiding means operates to avoid retrieval of said particular resource determined to include said attributes.

20. The system of claim 19, wherein said retrieval avoiding means comprises:

means for identifying resources as undesirable to said user, wherein said identifying means is operable to include said particular resource if determined to include said attributes by said determining means.

21. The system of claim 1, further comprising:

means for automatically avoiding communication of selected data packets.

22. The system of claim 21, wherein said selected data packets are Internet cookies.

23. The system of claim 21, wherein said communication avoiding means comprises:

means for determining if a resource associated with said data packet is provided by a network location different than a network location of a presently desired resource, wherein said communication avoiding means operates to avoid communication of said data packet if said associated resource is determined to be provided by a network address different than a presently desired resource and said data packet is of a preselected type.

24. A method for providing accelerated network interaction as experienced by a user of a processor-based system operating under control of a network user interface, said processor-based system coupled to a data communication network having a plurality of network devices coupled thereto, wherein said processor-based system includes a cache storing resources previously retrieved from said data communication network, said method comprising the steps of:

emulating interaction of said network user interface with said data communication network;

substantially immediately presenting a presently selected resource to said user from said cache without a prior determination that said selected resource in said cache is current, wherein said presenting step is operable with said emulating step to cause said presentation to appear to said user to have included network interaction; and retrieving from said data communication network said presently selected resource, wherein said retrieving step is operable as a diminished priority task to up-date said resource if stored in said cache and said selected resource in said cache is determined not to be current, and wherein said retrieving step is operable as a high priority task to retrieve said resource if not in said cache.

25. The method of claim 24, further comprising the step of:

notifying said user of the availability of an up-dated resource retrieved from said data communication network after said presenting said presently selected resource to said user from said cache.

26. The method of claim 24, wherein said emulating step utilizes an emulation software call library interposed between a network interaction software call library adapted to respond to calls for interaction with said communication network and said network user interface.

27. The method of claim 26, wherein said retrieving step utilizes said network interaction software call library.

28. The method of claim 24, further comprising the steps of:

caching network address name set information to provide conversion of network address names to network addresses without requiring data communication network interaction; and verifying from said data communication network a selected one of said network addresses and for retrieving said network address if determined to be erroneous by said verifying means.

29. The method of claim 24, further comprising the steps of:

retrieving from said data communication network at least one resource identifiable with said presently selected resource, said at least one identifiable resource being a resource not currently selected by said user, wherein said identifiable resource retrieving step operates as a diminished priority task to retrieve said at least one identifiable resource.

30. The method of claim 29, wherein the priority of said identifiable resource retrieving step is a priority level lower than that of said presently selected resources retrieving step.

31. The method of claim 29, wherein said identifiable resource retrieving step comprises the step of:

determining a resource associated with said presently selected resource most likely to be selected in the future.

32. The method of claim 31, wherein said determining step includes the step of:

identifying resources which have been previously accessed by said user.

33. The method of claim 24, further comprising the steps of:

identifying at least one resource unnecessary to said user, said identifying means operable substantially concurrently with said retrieving step; and controlling said retrieving step to forego retrieving said at least one resource identified as unnecessary.

34. The method of claim 33, wherein said at least one unnecessary resource is an advertisement.

35. The method of claim 33, wherein said identifying step comprises the steps of:

determining if a particular resource to be retrieved is a graphic resource; and determining if said particular resource is provided by a network address different than a network address of a presently selected resource.

36. The method of claim 33, wherein said identifying step comprises the step of:

determining if said at least one resource includes attributes indicative of a type of resource predetermined to be unnecessary.

37. The method of claim 24, further comprising the steps of:

identifying particular resources associated with said presently selected resource as a predetermined type of resource:

avoiding communication of data packets of said particular resources of said predetermined type determined to be unnecessary.

38. The method of claim 37, wherein said predetermined type of resource is an Internet cookie.

39. The method of claim 37, wherein said filtering step comprises the step of:

determining if a particular is provided by a network address different than a network address of said presently selected resource, wherein said avoiding communication of data packets of said particular resource if said particular resource is determined to be provided by a network address different than said presently selected resource.

40. A system for retrieving information over a network prior to the information being selected for use by a user of a processor-based system, said processor-based system coupled to a data communication network having a plurality of network devices coupled thereto, said system comprising:
   means for identifying information available from ones of said network devices associated with presently selected information;
   means for determining said information associated with said presently selected information most likely to be selected;
   means for retrieving from said data communication network information associated with said presently selected information, wherein said retrieving means operates to retrieve identified information determined to be most likely to be selected before other identified information; and
   means for presenting ones of said retrieved identified resources substantially immediately to said user upon subsequent selection for use by said user, wherein said presenting means operates to emulate network communication when presenting said ones of said retrieved identified resources to said user.

41. The system of claim 40, wherein said processor-based system is operating under control of a standardized network user interface and wherein each of said identifying means and determining means and retrieving means operate with said standardized network user interface substantially transparently to said user.

42. The system of claim 41, wherein each of said identifying means and determining means and retrieving means operate substantially transparently to said network user interface.

43. The system of claim 42, wherein said standardized network user interface comprises an Internet web browser.

44. The system of claim 40, wherein said determining means comprises:
   means for determining identified information which has been previously accessed by said user.

45. The system of claim 40, wherein said determining means comprises:
   means for compiling statistical information with respect to said user interacting with said data communication network, wherein said determination of identified information most likely to be selected is at least in part based on said statistical information.

46. The system of claim 40, wherein said retrieving means operates as a background task in said processor-based system.

47. The system of claim 40, wherein said retrieving means comprises:
   means for storing said retrieved identified information determined to be most likely to be selected before other identified information, wherein said stored retrieved identified information is presentable to said user substantially instantaneously upon selection of said retrieved identified information.

48. The system of claim 47, wherein said storing means comprises:
   means for distinguishing between retrieved identified information previously accessed by said user and retrieved identified information not previously accessed by said user; and
   means for purging said retrieved identified information not previously accessed by said user upon selection of other information after said retrieval of said retrieved identified information.

49. The system of claim 40, wherein said retrieving means comprises:
   means for identifying identified information previously accessed by said user; and
   means for retrieving said identified information previously accessed by said user only if said information has been changed since previously accessed by said user.

50. A computer program product having a computer readable medium having computer program logic recorded thereon for providing enhanced network interaction to a user of a processor-based system operating under control of a standardized network user interface, said processor-based system coupled to a data communication network having a plurality of network devices coupled thereto, wherein said processor-based system includes a cache storing resources previously retrieved from said data communication network, said computer program product comprising:
   means for interfacing substantially transparently to said network user interface;
   means for emulating interaction of said network user interface with said data communication network;
   means for substantially immediately presenting a presently selected resource to said user from said cache if stored therein, wherein said presenting means is operable with said emulating means to cause said presentation to appear to said user to have included network interaction; and
   means for retrieving from said data communication network said presently selected resource, wherein said retrieving means is operable as a diminished priority task to up-date said resource if stored in said cache, and wherein said retrieving means is operable as a high priority task to retrieve said resource if not stored in said cache.

51. The computer program product of claim 50, further comprising:
   means for determining at least one resource identifiable with said presently selected resource likely to be selected for presenting to said user, said at least one identifiable resource being a resource not currently selected by said user; and
   means for pre-retrieving from said data communication network said at least one resource identifiable with said presently selected resource, wherein said identifiable resource pre-retrieving means operates as a diminished priority task to retrieve said at least one associated resource.

52. The computer program product of claim 50, further comprising:
   means for identifying at least one resource unnecessary to said user, said identifying means operable substantially concurrently with said retrieving means; and
   means for controlling said retrieving means to forego retrieving said at least one resource identified as unnecessary.

53. The computer program product of claim 50, further comprising:
   means for identifying particular resources associated with said presently selected resource as a predetermined type of resource; and
   means for avoiding communication of data packets of said particular resources determined to be unnecessary.

54. A method of accelerating Internet browsing by a computer operating under control of an Internet browser application program, wherein said user computer has associated therewith a data cache of resources previously accessed by said Internet browser, and wherein said Internet browser has associated therewith a first library of software calls, said method comprising the steps of:

disposing a second library of software calls between said Internet browser and said first library of software calls; and causing said Internet browser to interact with the Internet through said second library, wherein said second library operates to emulate Internet exchanges and thereby immediately retrieve desired resources from said data cache when available in said data cache, and wherein said second library operates to cause said first library to conduct Internet exchanges to retrieve desired resources when not available in said data cache.

55. The method of claim 54, wherein said second library also operates to cause said first library to conduct Internet exchanges to up-date desired resources when available in said data cache.

56. The method of claim 54, wherein said first library is a Winsock library.

57. The method of claim 54, further comprising the steps of:

referencing said desired resources to determine resources not currently indicated as desired which are likely to be desired resources in the future;

referencing information available at said user computer to determine at least one most likely to be desired resource of said resources not currently indicated as desired; and pre-retrieving ones of said resources not currently indicated as desired, wherein said pre-retrieving step operates to pre-retrieve said most likely to be desired resource before other ones of said resources not currently indicated as desired.

58. The method of claim 54, further comprising the steps of:

identifying advertisement resources of said desired resources, wherein said step of causing said Internet browser to interact with the Internet through said second library to conduct Internet exchanges to retrieve desired resources when not available in said data cache is not performed to retrieve said identified advertisement resources.

59. The method of claim 54, further comprising the steps of:

classifying particular resources associated with said presently selected resource as a particular type of resource; and avoiding communication of data packets of said resources of said particular type.

60. A system for accelerating network interaction as experienced by a user of a first processor-based system coupled to a second processor-based system through a data communication network, wherein said first processor-based system includes a cache of resources previously accessed via said data communication network, said system comprising:

means for determining if a resource to be accessed is stored in said cache;

means for substantially immediately presenting said resource to said user if said resource is determined to be in said cache; and means for communicating over said network to access said resource to be accessed, wherein said communicating means comprises:

means for retrieving said resource via said data communication network, wherein said retrieved resource is stored in said cache when retrieved, wherein retrieval of said resource is accomplished as a high priority task of said first processor-based system if said resource is determined not to be in said cache; and means for determining if said resource as presented to said user from said cache has been changed, wherein said retrieval of said resource is accomplished as a low priority task of said first processor-based system if said resource is determined to be in said cache and determined to have been changed, and wherein said resource is not retrieved if said resource determined to be in said cache is determined not to have been changed.

61. The system of claim 60, wherein said communicating means further comprises:

means for identifying resources as undesirable to said user, said identifying means including identification of a plurality of resources previously determined to be undesirable to said user, wherein said retrieving means is operable to avoid retrieving said identified undesirable resources.

62. The system of claim 60, further comprising:

means for storing network address name set information to provide conversion of network address names to network addresses without requiring data communication network interaction.

63. The system of claim 60, further comprising:

means for verifying from said data communication network a selected one of said network addresses and for retrieving said network address if determined to be erroneous by said verifying means.

64. The system of claim 60, further comprising:

means for retrieving from said data communication network resources associated with said resource to be accessed, said associated resources being resources not currently selected, wherein said associated resources retrieving means operates as a low priority task of said first processor-based system to retrieve said associated resources.

65. A system for accelerating network interaction as experienced by a user of a first processor-based system coupled to a second processor-based system through a data communication network, wherein said first processor-based system includes a cache of resources previously accessed via said data communication network, said system comprising:

means for determining if a resource to be accessed is stored in said cache;

means for substantially immediately presenting said resource to said user if said resource is determined to be in said cache;

means for communicating over said network to access said resource to be accessed, wherein said communicating means comprises:

means for retrieving said resource via said data communication network, wherein said retrieved resource is stored in said cache when retrieved, wherein retrieval of said resource is accomplished as a high priority task of said first processor-based system if said resource is determined not to be in said cache;

means for determining if said resource as presented to said user from said cache has been changed, wherein said retrieval of said resource is accomplished as a low priority task of said first processor-based system if said resource is determined to be in said cache and determined to have been changed, and wherein said resource is not retrieved if said resource determined to be in said cache is determined not to have been changed; and means for identifying resources as undesirable to said user, said identifying means including identification of a plurality of resources previously determined to be undesirable to said user, wherein said retrieving means is operable to avoid retrieving said identified undesirable resources;

means for verifying from said data communication network a selected one of said network addresses and for retrieving said network address if determined to be erroneous by said verifying means; and means for retrieving from said data communication network resources associated with said resource to be accessed, said associated resources being resources not currently selected, wherein said associated resources retrieving means operates as a low priority task of said first processor-based system to retrieve said associated resources.

66. The system of claim 65, further comprising:

means for storing network address name set information to provide conversion of network address names to network addresses without requiring data communication network interaction.

67. A system for accelerating Internet browsing comprising:

user computer operating under control of an Internet browser application program, wherein said user computer has associated therewith a data cache of resources previously accessed by said Internet browser and wherein said Internet browser has associated therewith a first library of software calls;

a second library of software calls logically disposed between said Internet browser and said first library of software calls in a manner such that said Internet browser interacts with the Internet through said second library, wherein said second library operates to emulate Internet exchanges and thereby immediately retrieve desired resources from said data cache when available in said data cache and wherein said second library operates to cause said first library to conduct Internet exchanges to retrieve desired resources when not available in said data cache.

68. The system of claim 67 wherein said second library is further operable to cause said first library to conduct Internet exchanges to up-date desired resources when available in said data cache.

69. The system of claim 67 wherein said first library is a Winsock library.

70. The system of claim 67 further comprising:

software for referencing said desired resources to determine resources not currently indicated as desired which are likely to be desired resources in the future;

software for referencing information available at said user computer to determine at least one most likely to be desired resource of said resources not currently indicated as desired; and software for interacting with said first library to cause said first library to pre-retrieve ones of said resources not currently indicated as desired, wherein said software causes said first library to pre-retrieve said at least one most likely to be desired resource before other ones of said resources not currently indicated as desired.

71. The system of claim 67, further comprising:

software for identifying advertisement resources of said desired resources and causing said first library to not retrieve said identified advertisement resources when conducting said Internet exchanges to retrieve desired resources not available in said data cache.

72. The system of claim 67, further comprising:

software for classifying particular resources associated with said presently selected resource as a particular type of resource; and software for causing said first library to avoid communication of data packets of said resources of said particular type.

73. A method for retrieving information over a network prior to the information being selected for use by a user of a processor-based system, said processor-based system coupled to a data communication network having a plurality of network devices coupled thereto, said method comprising:

identifying information available from ones of said network devices associated with presently selected information;

determining said information associated with said presently selected information most likely to be selected;

retrieving from said data communication network information associated with said presently selected information, wherein said identified information determined to be most likely to be selected is retrieved before other identified information.

receiving at a user interface a selection of said retrieved information associated with said presently selected information; and emulating network communication in providing said retrieved information selected in said receiving step to said user interface.

74. The method of claim 73 further comprising presenting said retrieved information selected in said receiving step substantially immediately to said user.

75. The method of claim 73 wherein said determining step comprises determining identified information which has been previously accessed by said user.

76. The method of claim 73 wherein said retrieving step is performed as a background task in said processor-based system.

77. The method of claim 73 wherein said retrieving step further comprises:

identifying identified information previously accessed by said user; and retrieving said identified information previously accessed by said user from said data communication network only if said information has been changed since previously accessed by said user.

* * * * *